United States Patent
Teo et al.

(10) Patent No.: US 8,055,301 B2
(45) Date of Patent: *Nov. 8, 2011

(54) WIRELESS NETWORKS INCORPORATING IMPLICIT ANTENNA SELECTION BASED ON RECEIVED SOUNDING REFERENCE SIGNALS

(75) Inventors: Koon Hoo Teo, Lexington, MA (US); Neelesh B. Mehta, Secunderabad (IN); Jia Tang, College Station, TX (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 916 days.

This patent is subject to a terminal disclaimer.

(21) Appl. No.: 11/924,703

(22) Filed: Oct. 26, 2007

(65) Prior Publication Data

US 2009/0042616 A1   Feb. 12, 2009

Related U.S. Application Data

(63) Continuation-in-part of application No. 11/834,345, filed on Aug. 6, 2007.

(51) Int. Cl.
   *H04M 1/00*   (2006.01)
(52) U.S. Cl. .................. 455/562.1; 370/330; 455/442

(58) Field of Classification Search ............. 455/562.1; 370/339
See application file for complete search history.

(56) References Cited

U.S. PATENT DOCUMENTS

| | | | |
|---|---|---|---|
| 7,120,395 B2 * | 10/2006 | Tong et al. | 455/101 |
| 7,620,423 B2 * | 11/2009 | Jin et al. | 455/562.1 |
| 2004/0002364 A1 * | 1/2004 | Trikkonen et al. | 455/562.1 |
| 2007/0201350 A1 * | 8/2007 | Papasakellariou | 370/208 |
| 2008/0039098 A1 * | 2/2008 | Papasakellariou et al. | 455/442 |
| 2010/0103902 A1 * | 4/2010 | Kim et al. | 370/330 |

OTHER PUBLICATIONS

Technical Specification Group Radio Access Network, Sep. 2007.

* cited by examiner

*Primary Examiner* — Nick Corsaro
*Assistant Examiner* — Gerald Johnson
(74) *Attorney, Agent, or Firm* — Dirk Brinkman; Gene Vinokur

(57) ABSTRACT

A method and system selects antennas in a wireless network including a base station and user equipment (UE) transceivers. The base station specifies times and frequencies to transmit sounding reference signals (SRSs), and antennas to use to transmit the SRSs for the specified times and frequencies. The transceivers transmit the SRS according to the specified times, frequencies, and antennas. The stopping and starting of the SRS are specified implicitly. The base station selects subsets of the set of available sets of antennas, and indicates the selected subset of antennas to the transceiver.

7 Claims, 26 Drawing Sheets

200

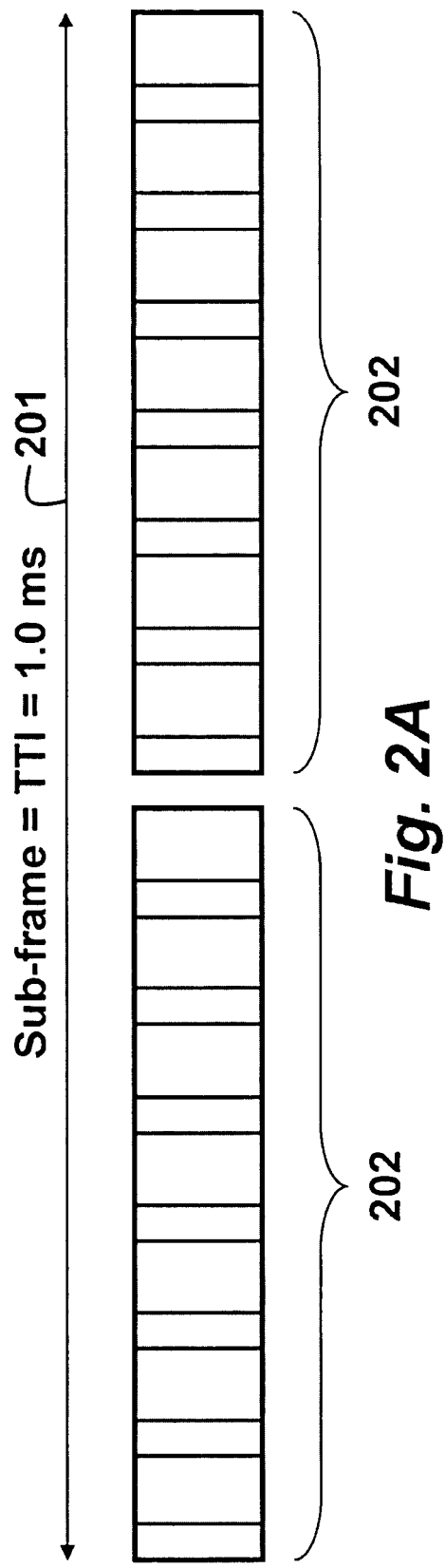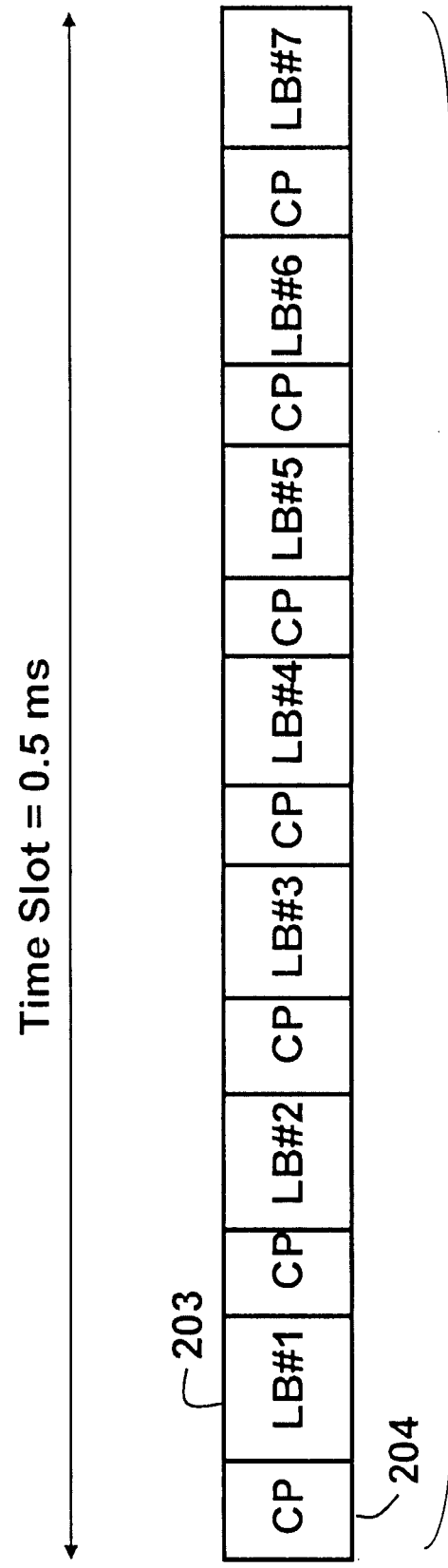
Fig. 2A
Fig. 2B

230

Legend for Protocol [option1]

401 — Wideband or variable bandwidth SRS

402 — Narrow-band hopping SRS

403 — Data block (sub-frame) if no SRS is sent at the same TTI

404 — Data block (sub-frame) if SRS is sent at the same TTI

405 — No data to send in a TTI

406 — Level-B slower signaling: SRS parameters & SRS request

407 — Level-C faster signaling: AS & scheduling decision

*Fig. 4*

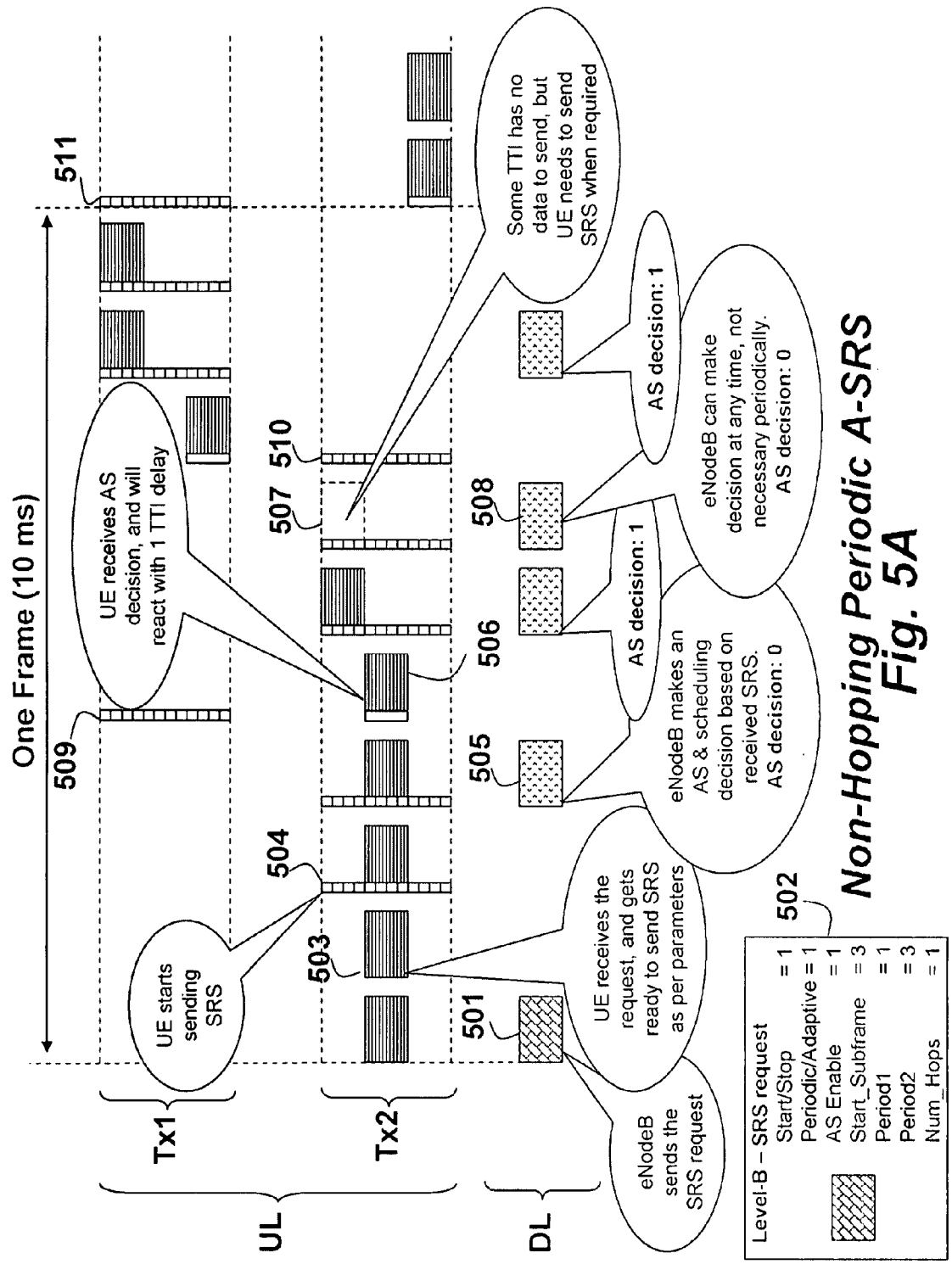

Non-Hopping Periodic R-SRS

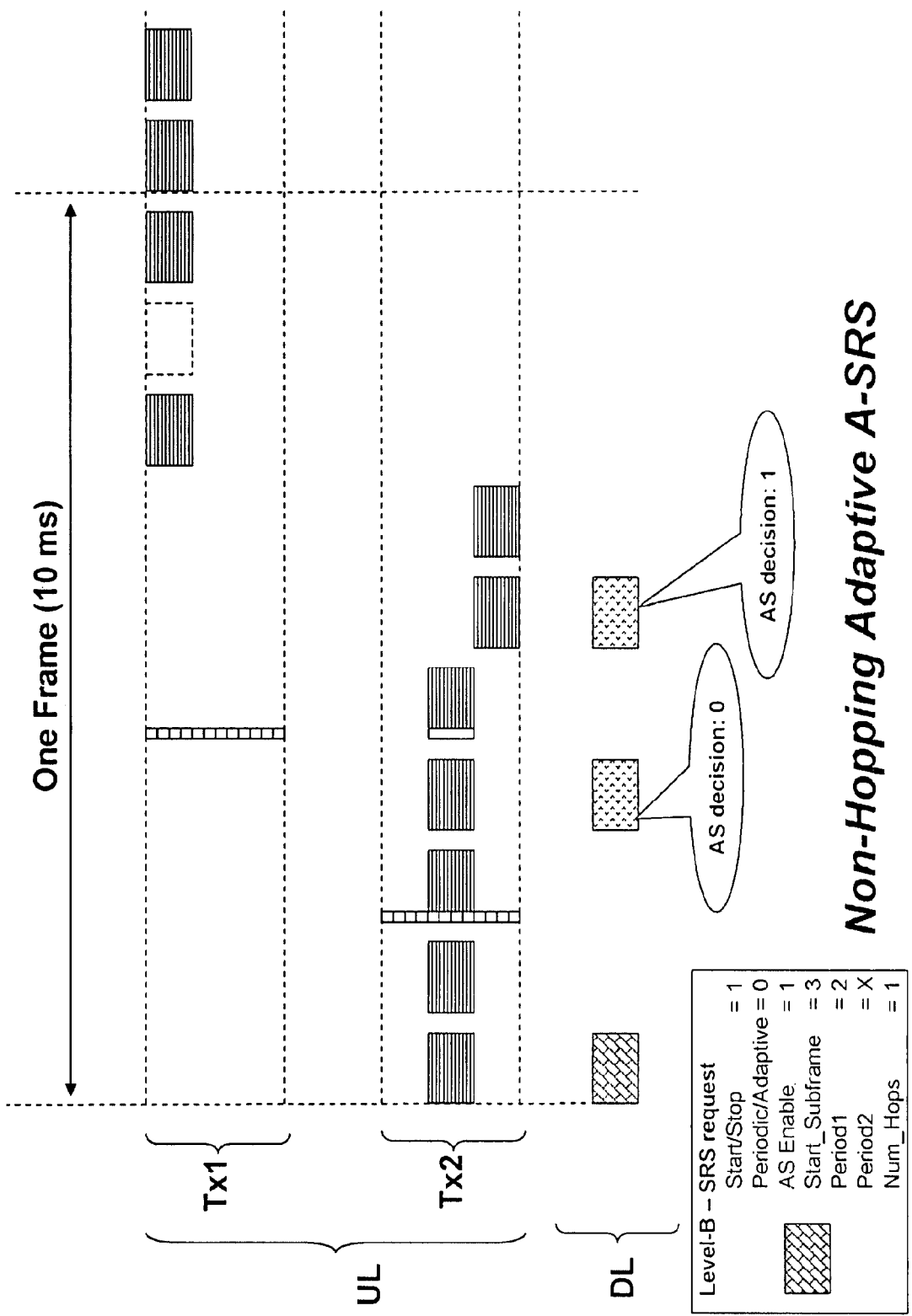

Non-Hopping Adaptive R-SRS

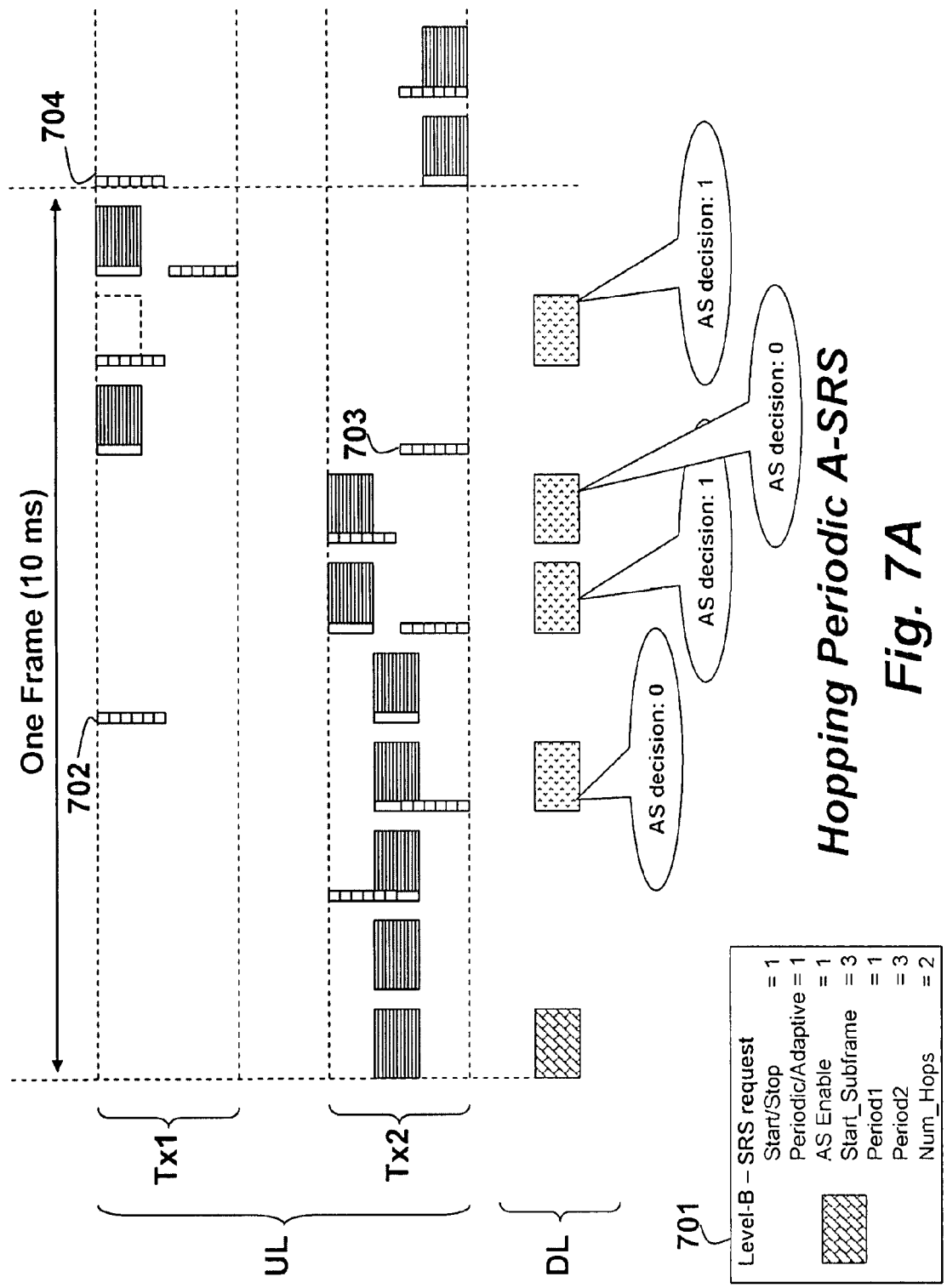

Hopping Periodic R-SRS

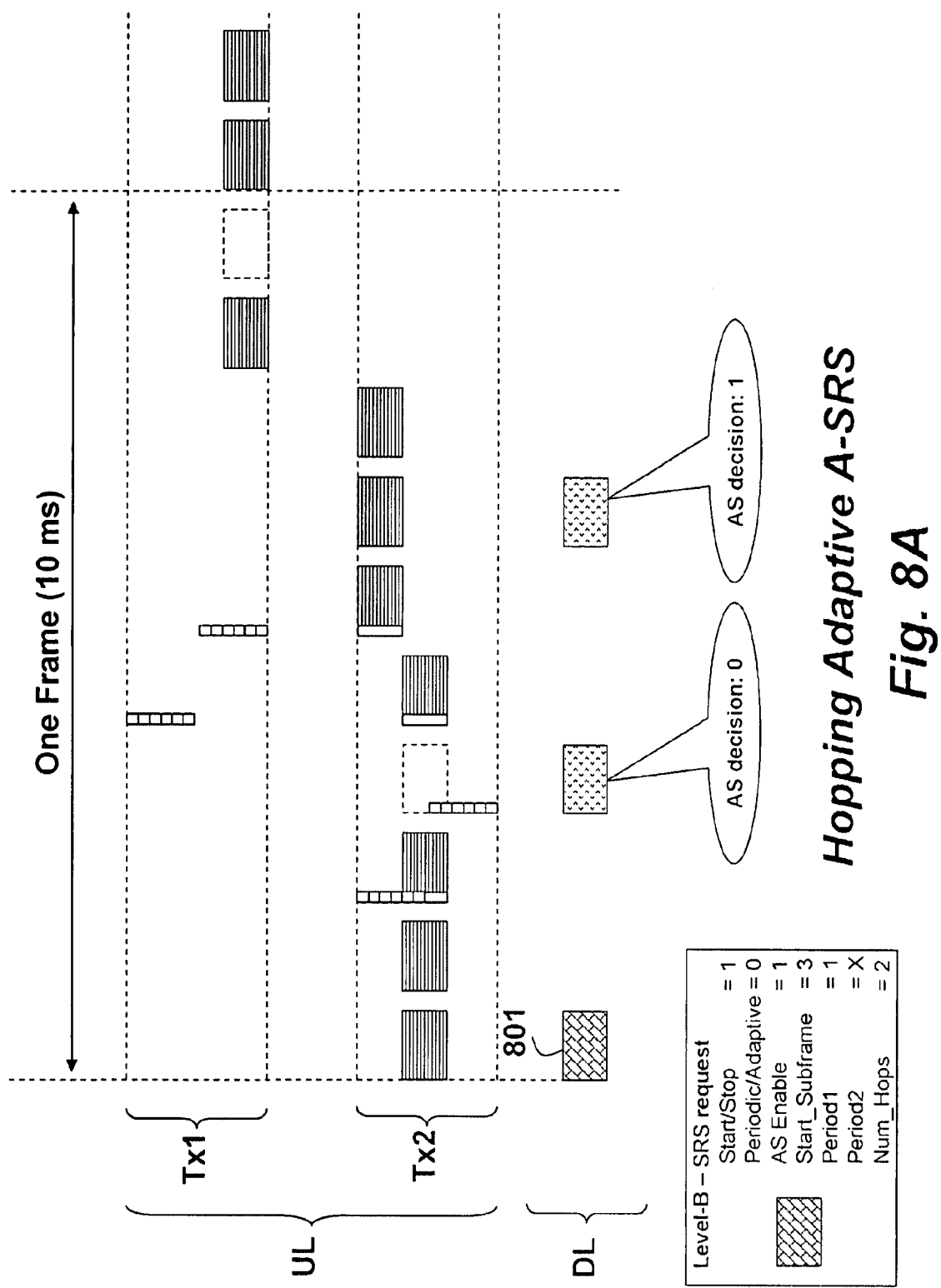

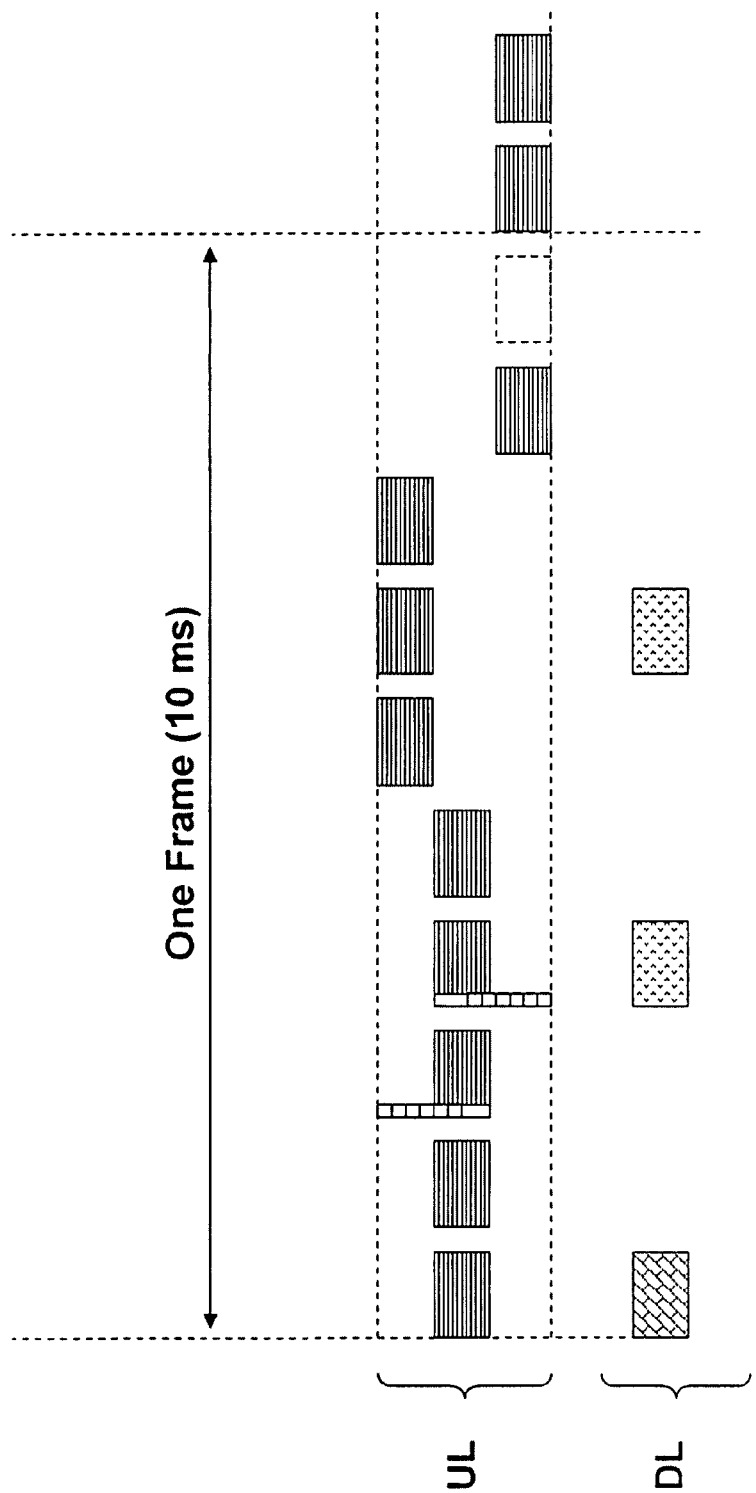

Legend for Protocol [option2]

- 901: Wideband or variable bandwidth SRS
- 902: Narrow-band hopping SRS
- 903: Data block (sub-frame) if no SRS is sent at the same TTI
- 904: Data block (sub-frame) if SRS is sent at the same TTI
- 905: No data to send in a TTI
- 906: Level-B slower signaling: SRS parameters
- 907: Level-C faster signaling: SRS request (to start)
- 908: Level-C faster signaling: AS & scheduling decision

*Fig. 9*

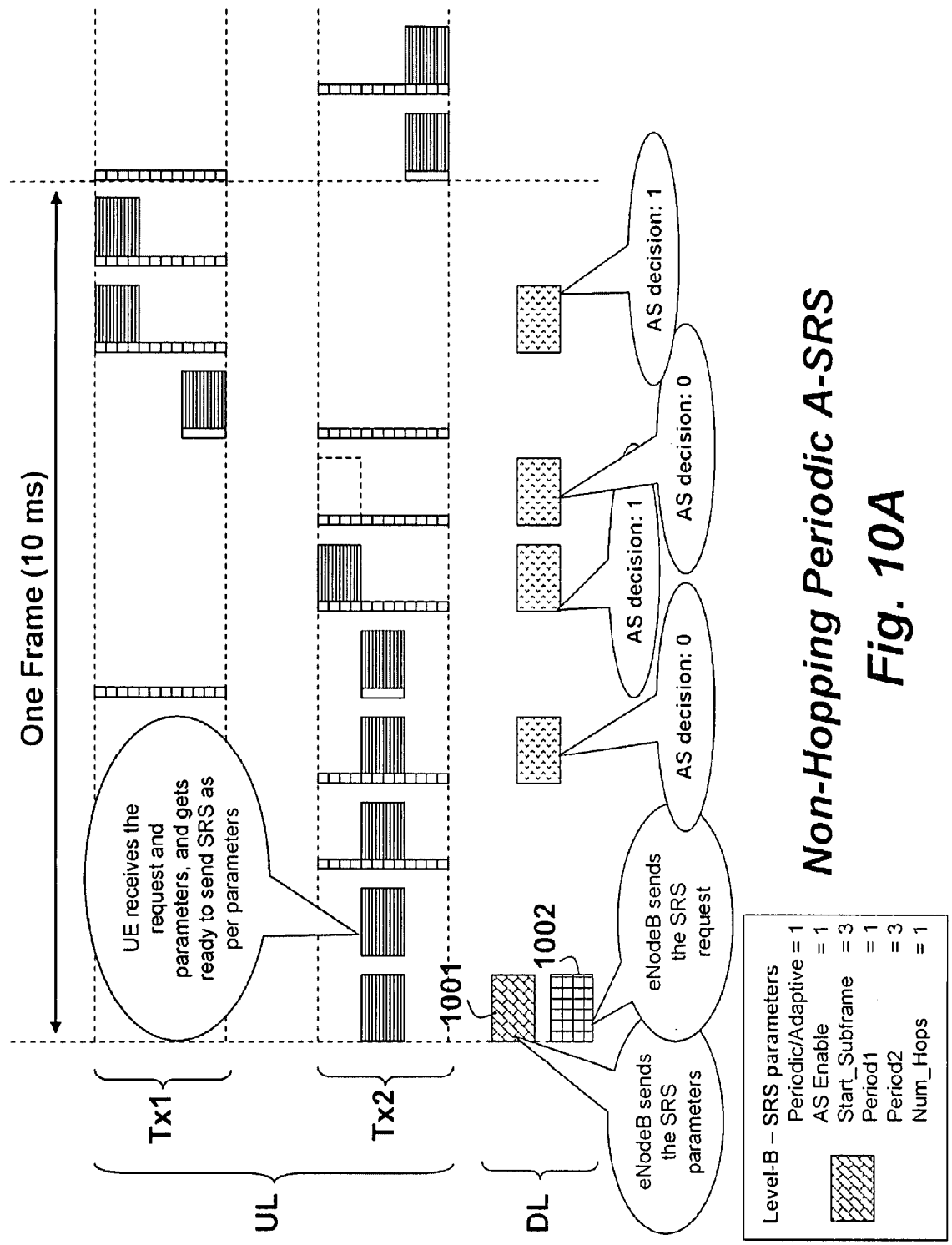

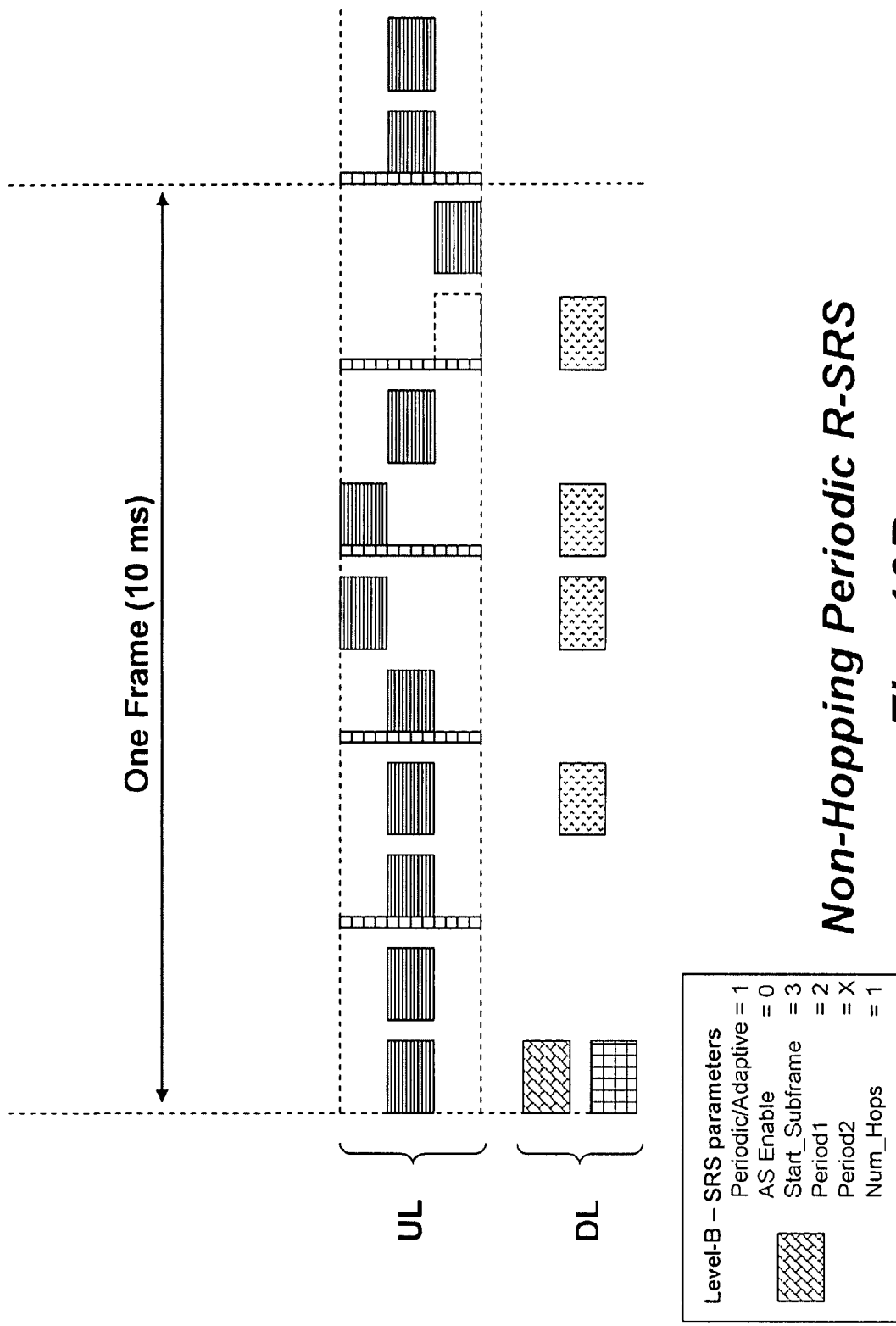

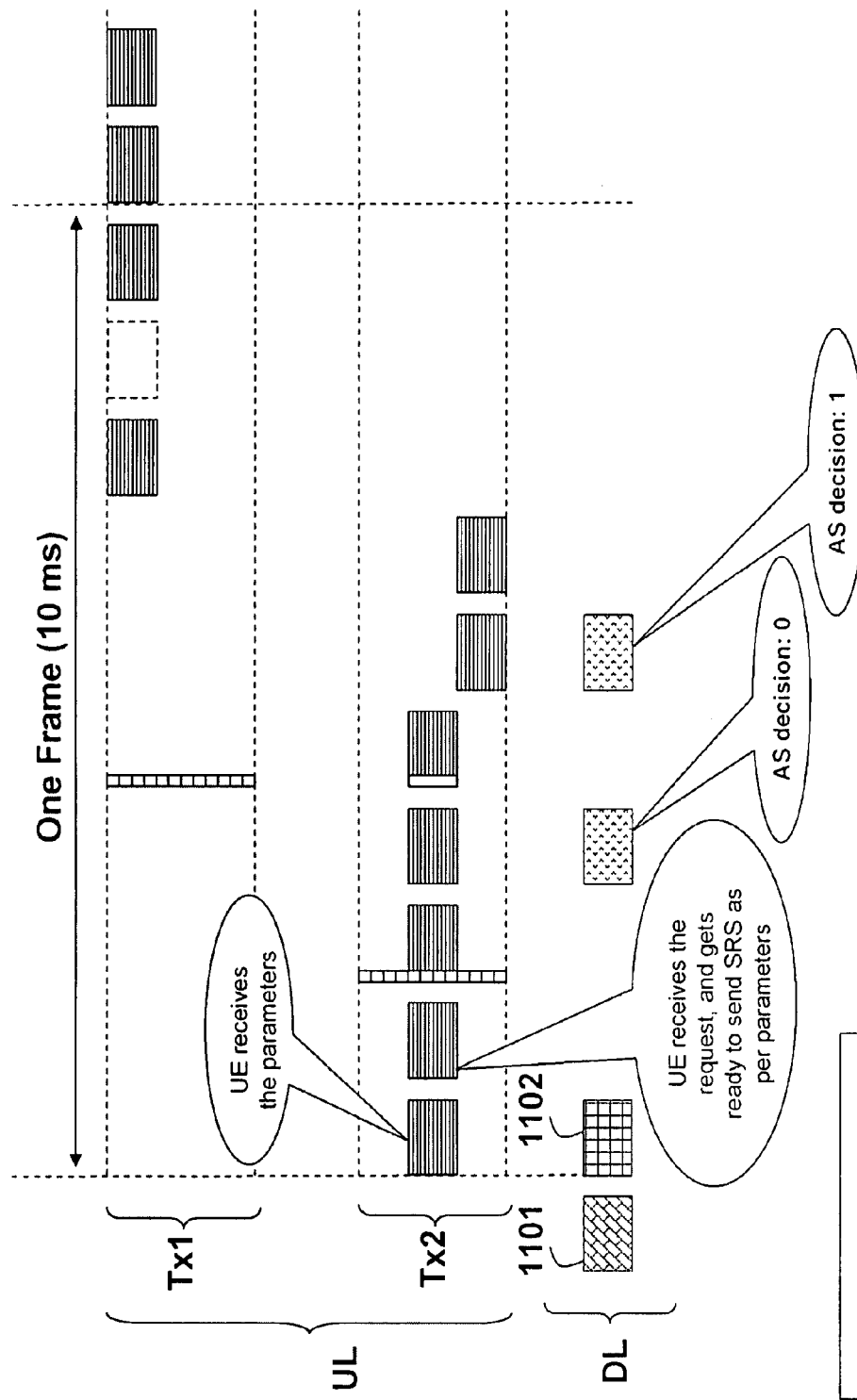

Non-Hopping Adaptive R-SRS

Hopping Periodic A-SRS

Hopping Periodic R-SRS

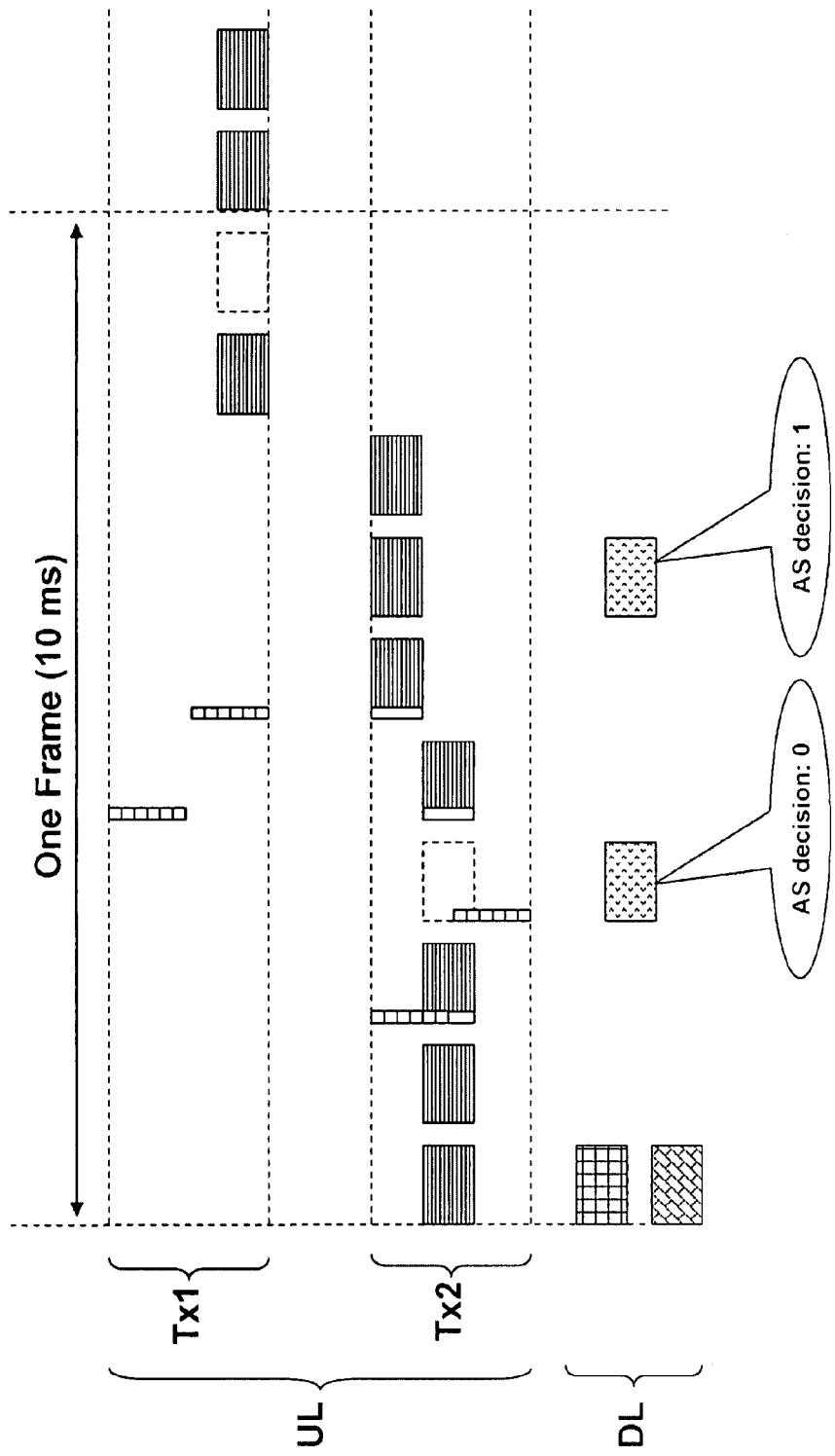
Fig. 13A Hopping Adaptive A-SRS

Hopping Adaptive R-SRS

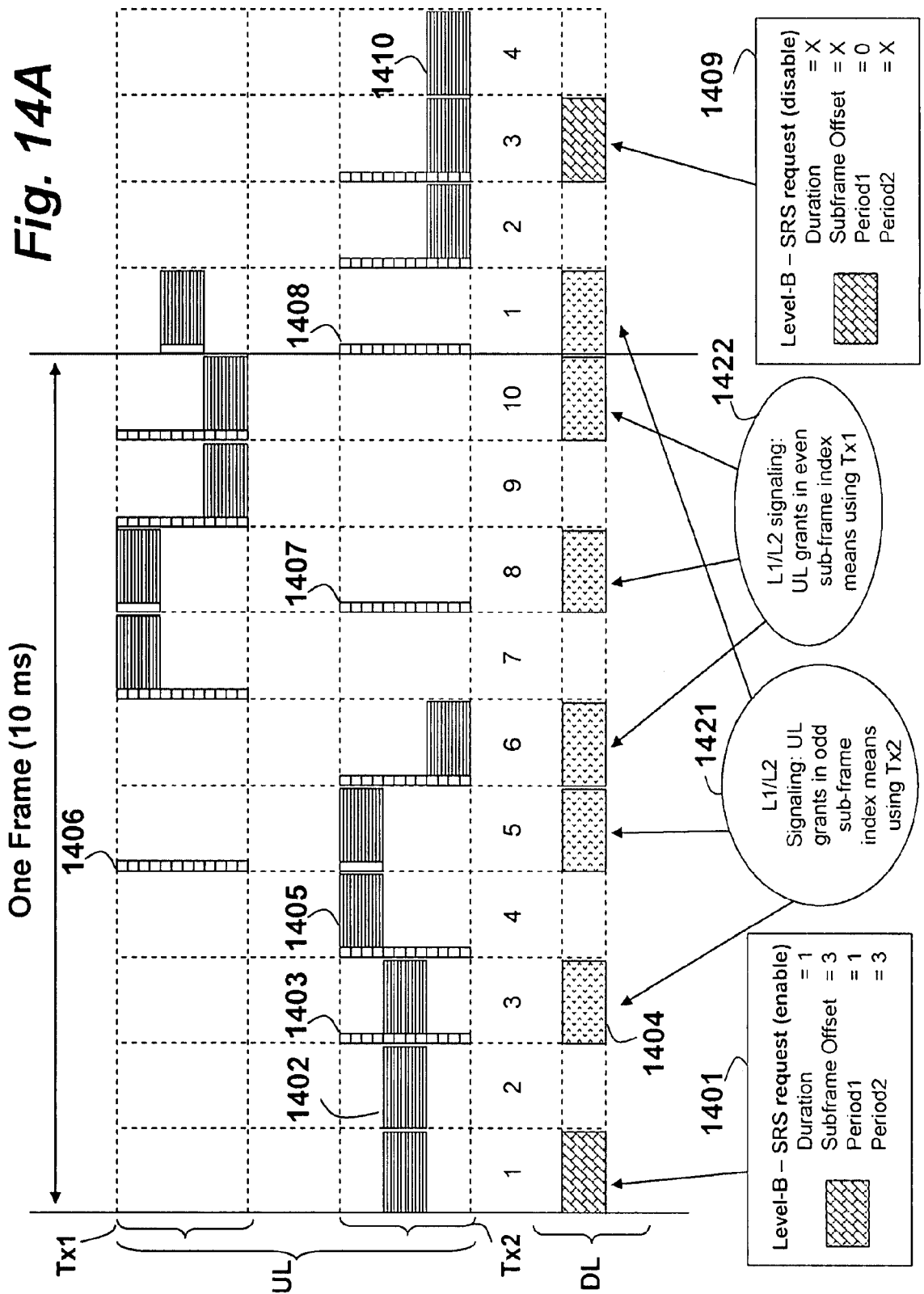

WIRELESS NETWORKS INCORPORATING IMPLICIT ANTENNA SELECTION BASED ON RECEIVED SOUNDING REFERENCE SIGNALS

RELATED APPLICATION

This is a Application is a Continuation-in-Part of and claims priority to U.S. patent application Ser. No. 11/834,345, "Method for Selecting Antennas in a Wireless Networks," filed Aug. 6, 2007 by Teo et al., the contents of which are hereby incorporated by reference as if fully set forth herein.

FIELD OF INVENTION

This invention relates generally to antenna selection in wireless networks, and more particularly to selecting antennas in wireless networks.

BACKGROUND OF THE INVENTION

OFDM

Orthogonal frequency division multiplexing (OFDM) is a multi-carrier communication technique, which employs multiple orthogonal sub-carriers to transmit parallel data streams. Due to the relatively low symbol-rate on each of the sub-carriers, OFDM is robust to severe channel conditions, such as frequency attenuation, narrowband interference, and frequency-selective fading. By prepending a cyclic prefix (CP) in front of each symbol, OFDM can eliminate inter-symbol interference (ISI) when the delay spread of the channel is shorter than the duration of CP. OFDM can also simplify frequency-domain channel equalization because the inner-carrier sub-carriers are orthogonal to each other to eliminate inter-carrier interference (ICI).

OFDMA

When OFDM is combined with a multiple access mechanism, the result is orthogonal frequency division multiplexed access (OFDMA). OFDMA allocates different sub-carriers or groups of sub-carriers to different transceivers (user equipment (UE)). OFDMA exploits both frequency and multi-user diversity gains. OFDMA is included in various wireless communication standards, such as IEEE 802.16 also known as Wireless MAN. Worldwide Interoperability for Microwave Access (WiMAX) based on 802.16 and the $3^{rd}$ generation partnership project (3GPP) long-term evolution (LTE), which has evolved from Global System for Mobile Communications (GSM), also use OFDMA.

SC-FDMA Structure in LTE Uplink

The basic uplink (UL) transmission scheme in 3GPP LTE uses a single-carrier FDMA (SC-FDMA) with cyclic prefix (CP) to achieve uplink inter-user orthogonality and to enable efficient frequency-domain equalization at the receiver side. This allows for a relatively high degree of commonality with the downlink OFDM scheme such that the same parameters, e.g., clock frequency, can be used.

Antenna Selection

The performance of the system can be enhanced by multiple-input-multiple-output (MIMO) antenna technology. MIMO increases system capacity without increasing system bandwidth. MIMO can be used to improve the transmission reliability and to increase the throughput by appropriately utilizing the multiple spatially diverse channels.

While MIMO systems perform well, they may increase the hardware cost, signal processing complexity, power consumption, and component size at the transceivers, which limits the universal application of MIMO technique. In particular, the RF chains of MIMO systems are usually expensive. In addition, the signal processing complexity of some MIMO methods also increases exponentially with the number of antennas.

While the RF chains are complex and expensive, antennas are relatively simple and cheap. Antenna selection (AS) reduces some of the complexity drawbacks associated with MIMO systems. In an antenna selection system, a subset of an set of the available antennas is adaptively selected by a switch, and only signals for the selected subset of antennas are processed by the available RF chains.

Signaling and Protocol Design for Antenna Selection

In order to indicate one antenna out of two possible antennas (A and B), one scheme uses 1 of bit information, either explicitly or implicitly, into an "uplink scheduling grant" message, which indicates the antenna selection decision, 0 means antenna A, and 1 indicates antenna B.

In the prior art, antenna selection is typically performed using pilot signals. Furthermore, antenna selection has been performed only for small-range indoor wireless LANs (802.11n), and where only a single user is on a wideband channel at any one time, which greatly simplifies antenna selection.

In the prior art, sounding reference signals (SRS) and data demodulation (DM) reference signals are only used for frequency dependent scheduling.

A protocol and exact message structure for performing antenna selection for large-range, outdoor OFDMA 3GPP networks is not known at this time. It is desired to provide this protocol and message structure for performing antennas selection for an uplink of an OFDMA 3GPP wireless network.

SUMMARY OF THE INVENTION

The embodiments of the invention provide a method and system for selecting antennas in an uplink of an OFDM wireless networks using sounding reference frames. Three levels of signaling are described.

Level-A signaling is used to indicate if both the transmitter and the receiver support antenna selection. Level-A signaling Occurs rarely, e.g., only during user registration, i.e., when the UE transceiver joins the network.

Level-B signaling is used to provide antenna selection parameters to the UE transceiver using, for example, network layer three radio resource control (RRC) messages, and possibly the request to start or stop antenna selection.

Level-C signaling is used to indicate antenna selection decisions, and possibly the request to start or stop antenna selection.

The antenna selection can be explicit or implicit.

The protocol according to the embodiments of the invention supports various periodic and adaptive antenna selection configurations, and also allows for switching between periodic and adaptive antenna selections. The protocol also supports antenna selection for non-hopping SRS and hopping SRS. The SRS can be either a wideband signal, a variable bandwidth signal, or a narrow-band signal. The protocol supports antenna selection for packet retransmission in both asynchronous HARQ and synchronous HARQ modes.

BRIEF DESCRIPTION OF THE DRAWINGS

FIG. 2A is a block diagram of sub-frame structure according to an embodiment of the invention;

FIG. 2B is a block diagram of time-slot structure according to an embodiment of the invention;

FIG. 4 is a block diagram of legend descriptions used for FIGS. 5A to 8B according to embodiments of the invention;

FIGS. 5A to 8B are block diagrams of protocols for Option1 signaling according to embodiments of the invention;

FIG. 9 is a block diagram of legend description used for FIGS. 10A to 13B according to embodiments of the invention;

FIGS. 10A to 13B are block diagrams of protocols for Option2 signaling according to embodiments of the invention;

FIG. 14A is a block diagram of non-hopping A-SRS protocols in the presence of a parameter "Period2" according to embodiments of the invention.

DETAILED DESCRIPTION OF THE INVENTION

LTE System Overview

Figure 1A:
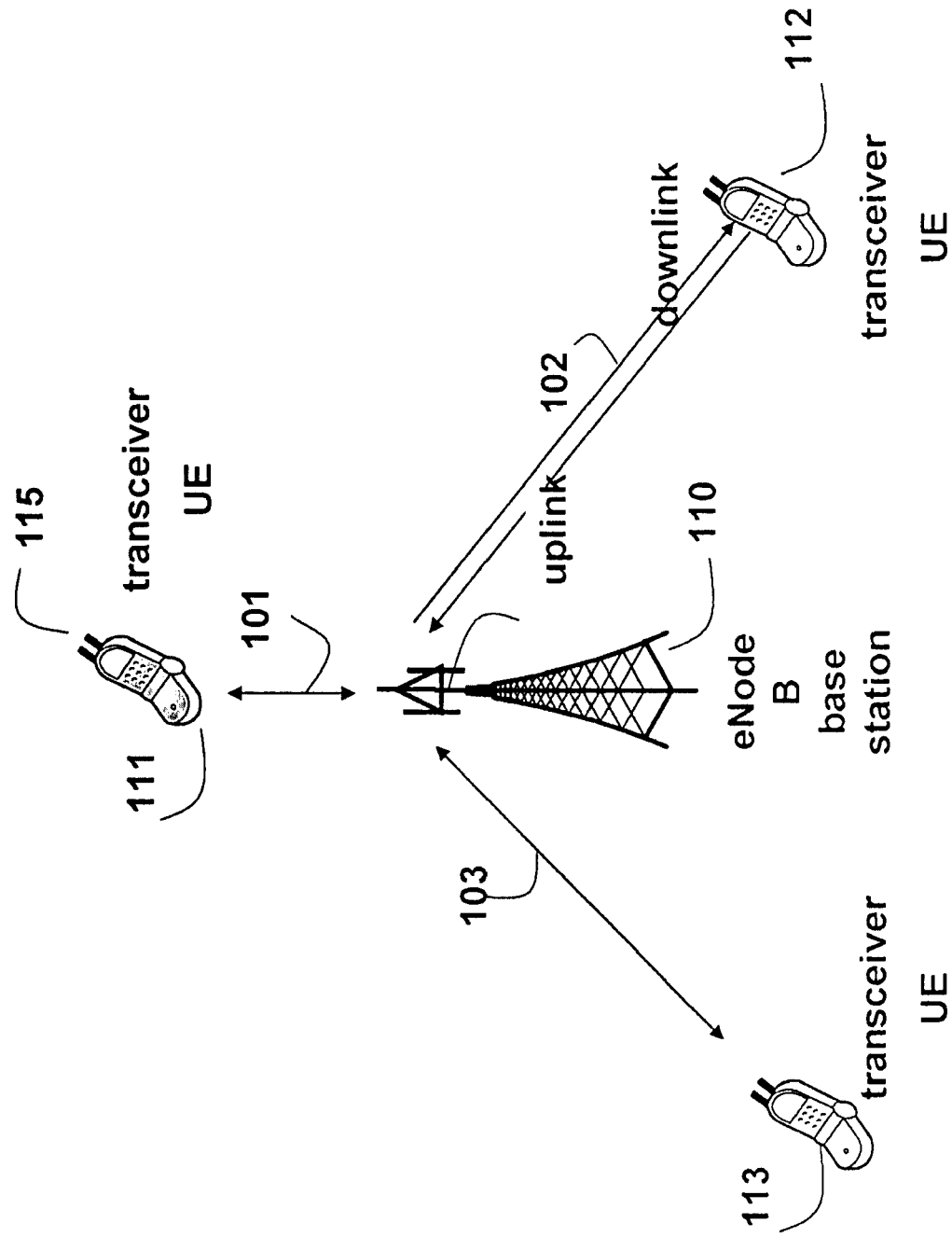
FIG. 1A is a block diagram of a wireless network according to an embodiment of the invention.

FIG. 1 shows the general structure of an OFDMA 3GPP LTE wireless network according to an embodiment of the invention. Multiple user equipments (UEs) or transceivers 111-113 communicate with a base station 110. It should be understood that the base station also operates as a transceiver. However, hereinafter, reference to transceivers means UE, unless specified otherwise. It should be noted that invention can also be used with SC-FDMA and OFDM networks.

The base station is called an evolved Node B (eNodeB) in the 3GPP LTE standard. The eNodeB 110 manages and coordinates all communications with the transceivers in a cell using connections 101, 102, 103. Each connection can operate as a downlink from the base station to the UE or an uplink from the UE to the base station. Because the transmission power available at the base station is orders of magnitude greater than the transmission power at the UE, the performance on the uplink is much more critical.

To perform wireless communication, both the eNodeB and the transceivers are equipped with at least one RF chain and one antenna. Normally, the number of antennas and the number RF chains are equal at the eNodeB. The number of antennas at the base station can be quite large, e.g., dozens. However, due to the limitation on cost, size, and power consumption, UE transceivers usually have less RF chains than antennas 115. The number of antennas available at the UE is relatively small, e.g., two or four, when compared with the base station. Therefore, antenna selection as described is applied at the transceivers. However, the base station can also perform the antenna selection as described herein.

Generally, antennas selection selects a subset of antennas from a set of available antennas at the transceivers.

LTE Frame Structure

Figure 1B:
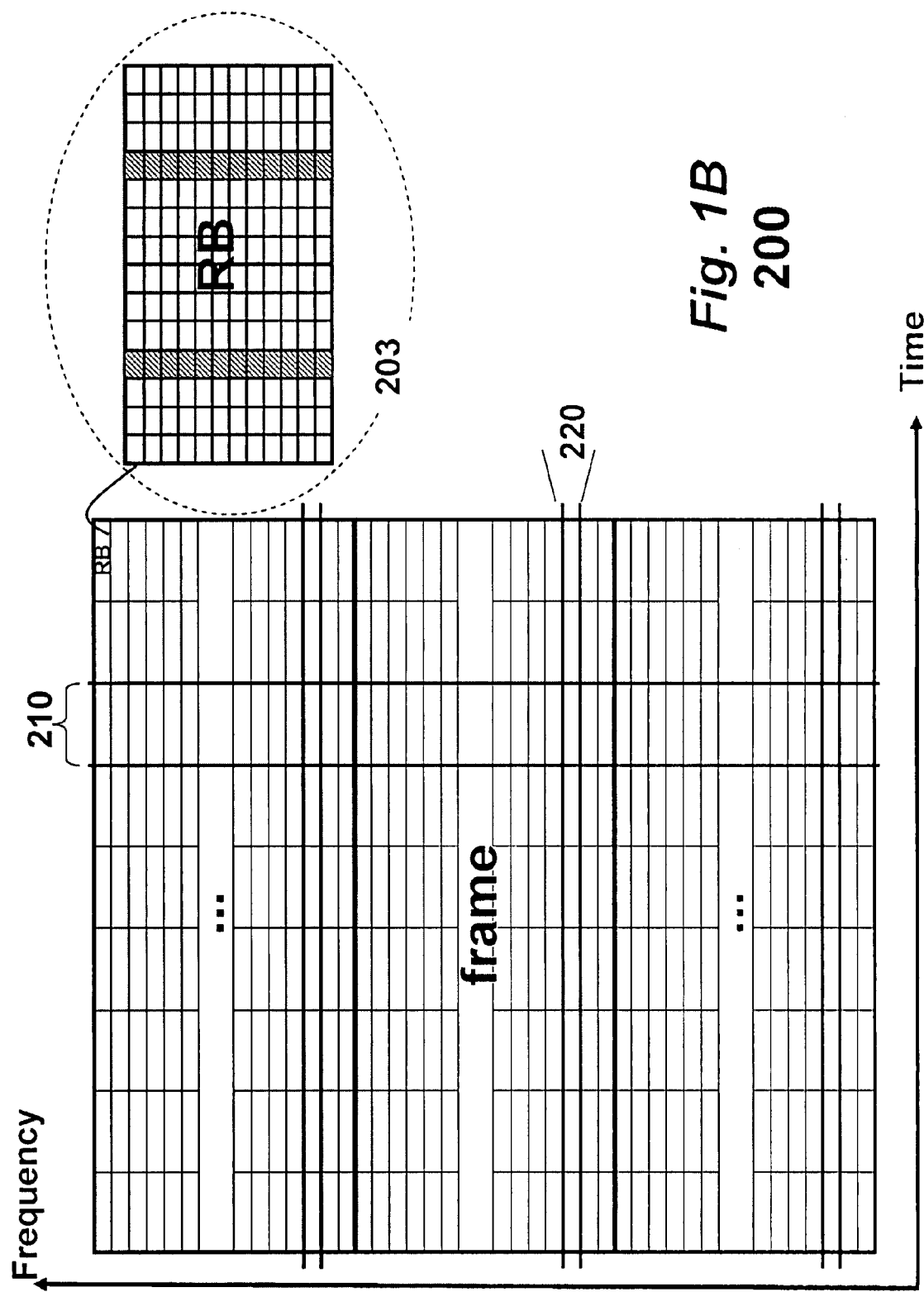
FIG. 1B is a block diagram of a frame according to an embodiment of the invention.

FIG. 1B shows the basic structure of a 10 ms frame 200 according to an embodiment of the invention. The horizontal axis indicates time and the vertical axis indicates frequency. The frame includes ten 1 ms sub-frames 210 in the time domain. The frame is also partitioned into frequency bands 220, e.g. fifty. The number of bands depends on the total bandwidth of the channels, which can be in the ranges of several megaHertz. Each sub-frame/band constitutes a resource block, see inset 230 and FIG. 2C for details.

Method

Figure 1C:
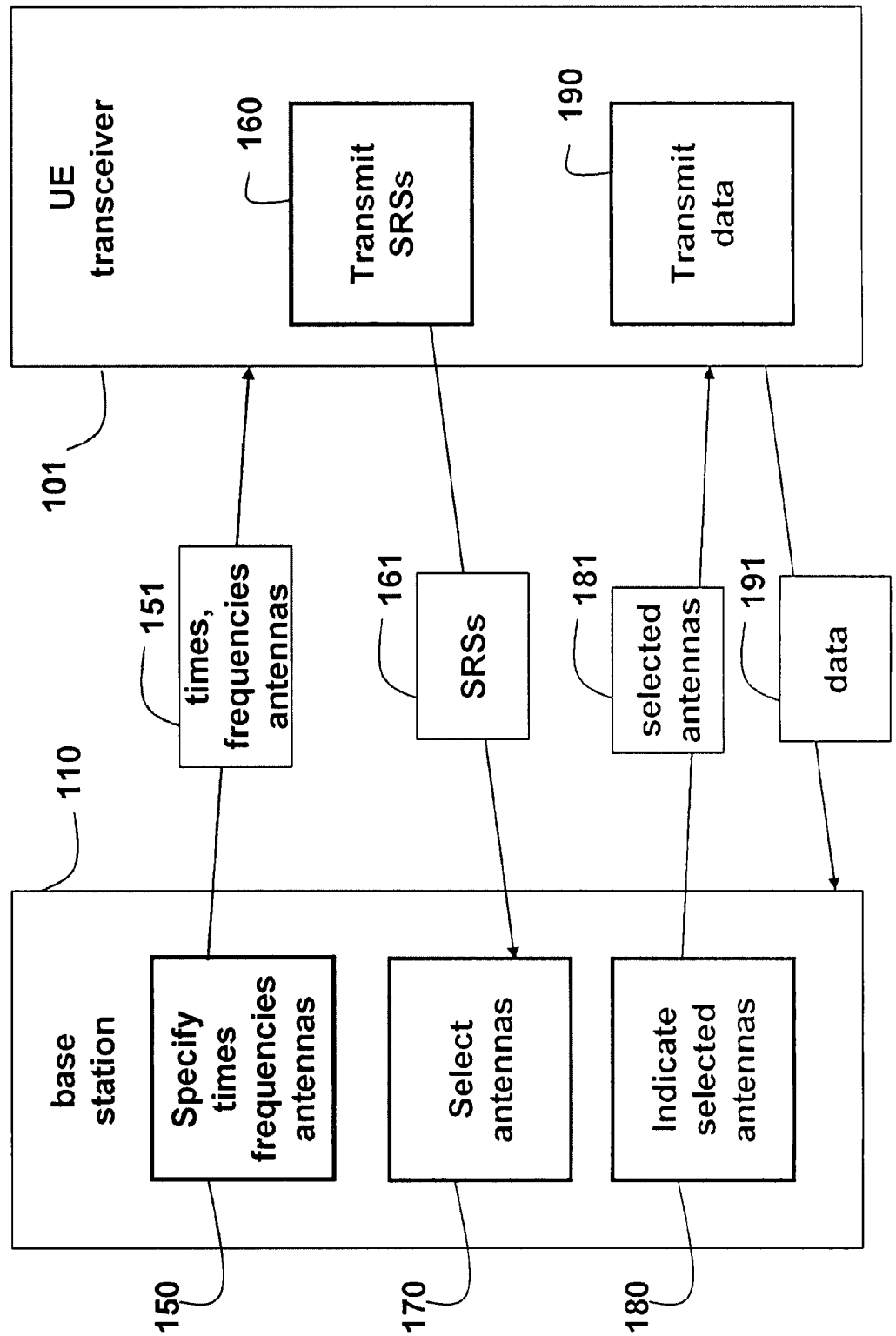
FIG. 1C is a method for selecting antennas according to an embodiment of the invention.

FIG. 1C shows the basic method for antenna selection according to an embodiment of the invention. The base station 110 specifies times and frequencies to transmit sounding reference signals (SRSs) 161, and specifies which antennas of the set of available antennas to use to transmit the SRSs for the specified times and frequencies. The transceiver 101 transmits the SRSs 161 according to the specified times, frequencies, and antennas 151.

The base station selects 170 a subset of antennas 181 based on the received SRSs 161. The base station then indicates 180 the selected subset of antenna 181 to the transceiver. Subsequently, the transceiver 101 can transmit 190 data 191 using the selected subset of antennas 181. The transceiver can also use the same subset of antennas for receiving data from the base station.

LTE Frame Structure

FIG. 2A shows a general structure of a sub-frame according to an embodiment of the invention. In 3GPP LTE, the transmission time of a frame is partitioned into TTIs (transmission time interval) 201 of duration 1.0 ms. The terms 'TTI' and 'sub-frame' are used interchangeably. The frame is 10 ms long, which includes 10 TTIs. The TTIs include time-slots 202.

FIG. 2B shows a general structure of a time-slot according to an embodiment of the invention. As described above, the TTI is the basic transmission unit. One TTI includes two equal length time-slots 202 each with a duration of 0.5 ms. The time-slot includes seven long blocks (LB) 203 for symbols. The LBs are separated by cyclic prefixes (CP) 204. In total, one TTI comprises fourteen LB symbols. It should be noted that the invention is not limited to a specific frame, sub-frame, or time-slot structure.

Figure 2C:
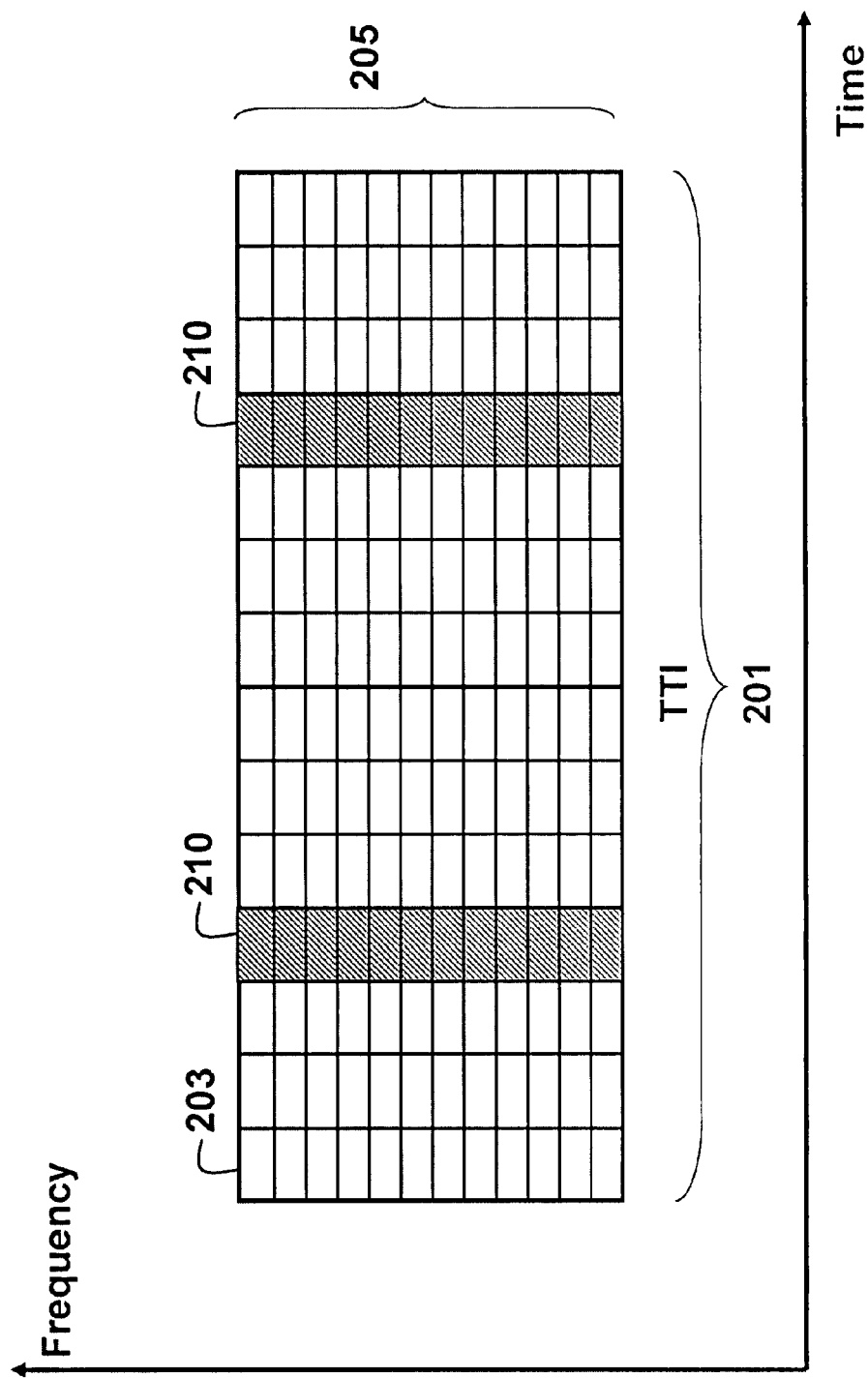
FIG. 2C is a block diagram of a resource block according to an embodiment of the invention.

FIG. 2C shows the details of one resource block (RB) 230 during one TTI 201 according to an embodiment of the invention. The TTI is partitioned, in time, into fourteen LBs 203. Each LB can carry a symbol. The entire system bandwidth, e.g., of 5 MHz or 10 MHz or 20 MHz, is partitioned divided into sub-carriers 205 at different frequencies. Groups of twelve contiguous sub-carriers, as shown, within one TTI are called resource blocks (RBs). For example, 10 MHz of bandwidth within 1 TTI might include fifty RBs in the frequency domain. The two shaded LBs 210, i.e., the $4^{th}$ and the $11^{th}$ LBs, carry data demodulation (DM) reference signals (RS) that are known to the receiver. The DM RS enables the receivers to estimate the channel state of the RBs assigned to the transceiver and coherently demodulate the unknown data carried in the other LBs. That is, in the prior art, DM reference signals are only used for channel estimation prior to data demodulation. For clarity the CPs are not shown in FIG. 2C. It Should be noted that the invention is not limited to a specific number of LBs during the TTI or the location of the DM RSs in the TTI. According to one embodiment of the invention, the DM reference signal is also used for antenna selection.

Sounding Reference Signal (SRS)

Except for the $4^{th}$ and the $11^{th}$ LBs, the other LBs are used for transmitting control and data signals, as well as uplink sounding reference signals (SRS). For instance, the first LB can carry the SRS. The SRS is usually a wideband or variable bandwidth signal. The SRS enables the base station to estimate the frequency response of the entire system bandwidth or a portion thereof. This information enables the base station to perform resource allocation such as uplink frequency-domain scheduling.

According to the embodiment of the invention, the SRSs are also used for antenna selection.

Another option considered for 3GPP LTE is a frequency-hopping (FH) based SRS. Specifically, a hopping SRS, with a bandwidth smaller than the system bandwidth, is transmitted based on a pre-determined hopping pattern. The hopped SRSs, over multiple transmission, span a large portion of the system bandwidth or even the entire system bandwidth. With frequency hopping the probability that transceivers interfere with each other during sounding is decreased.

In 3GPP LTE, the eNodeB can enable and disable SRS transmission by the UE transceiver. Moreover, when antenna selection is enabled, the eNodeB can specify the SRS parameters to the transceiver, including transmission bandwidth, starting or ending bandwidth position, transmission period, cyclic shift hopping sequence, transmission stub-frame, repetition factor for indicating the density of the pilot subcarriers in the SRS LB, duration of SRS transmission, symbol position of SRS within a sub-frame, and hopping SRS related parameters, among others. Furthermore, to support antenna selection by using SRS, the same SRS is used by all antennas. Thus, the eNodeB knows in advance, which antenna is sending the SRS.

In one embodiment of the invention, we describe a format and protocol for antenna selection by using SRS in the 3GPP LTE wireless network. When SRS are used for antenna selection, the SRS is called an antenna selection SRS (A-SRS). Otherwise, the SRS is called a regular SRS (R-SRS). Making the A-SRS protocol compatible with the R-SRS protocol ensures that extra signaling overhead associated with A-SRS is as low as possible.

Signaling for Antenna Selection

In general, our invention comprises three levels of messages, namely, Level-A registration signaling, Level-B slow signaling, and Level-C fast signaling, all or some of which can be used for antenna selection. A summary of the possible signaling messages for enabling antenna selection is shown in Table 1A and Table 1B, where the two tables correspond to two slightly different Signaling options: Option1 and Option2.

The major difference between Option1 and Option2 is the "SRS start/stop" message. The "SRS start/stop" is a Level-B message in Option1 and a Level-C message in Option2. In the following, we first describe Option1 in details. Then, we describe Option2 by mainly focusing on the differences between the two options.

TABLE 1A

Signaling messages for antenna selection [Option1]

| | Field | Message Layer | Size (bits) | Comment |
|---|---|---|---|---|
| UL | Level-A: Registration | L3 | [1] | The UE notifies eNodeB if UE supports uplink antenna selection. |
| DL | Level-A: Registration | L3 | [1] | The eNodeB notifies UE if eNodeB supports antenna selection. |
| | Level-B: Slower Signaling | L3 | [FFS] | a) SRS start/stop. b) Enable/disable A-SRS, and set up A-SRS parameters when AS is enabled. |
| | Level-C: Faster Signaling | L1 | [1] | Antenna selection decision about which subset of antennas UE should use for transmission. |

In the above table, "FFS" means "for further specification.

TABLE 1B

Signaling messages for antenna selection [Option2]

| | Field | Message Layer | Size (bits) | Comment |
|---|---|---|---|---|
| UL | Level-A: Registration | L3 | [1] | The UE notifies eNodeB if UE supports uplink antenna selection. |
| DL | Level-A: Registration | L3 | [1] | The eNodeB notifies UE if eNodeB supports antenna selection. |
| | Level-B: Slower Signaling | L3 | [FFS] | Enable/disable A-SRS, and set up A-SRS parameters when AS is enabled. |
| | Level-C: Faster Signaling | L1 | [3] | a) SRS start/stop. b) Antenna selection decision about which subset of antennas UE to use for transmission (and reception). |

Signaling Description for [Option1]

As shown in Table 1A, the Level-A registration signaling indicates whether both the transceiver and the eNodeB support uplink (UL) antenna selection. If the eNodeB does not support antenna selection but the transceiver does, the transceiver call use open-loop antenna selection, which does not require any support from the eNodeB. This information is exchanged between the transceiver and the eNodeB at the beginning of the communications, for example, when the transceiver registers with the wireless network upon entry.

Level-B is a layer 3 (or radio resource control (RRC) layer) signaling that is used to set up AS training parameters for the SRS. Level-B is a slow form of signaling that is used infrequently. The eNodeB uses Level-B signaling to stop and start the transceiver to send the A-SRS, or to change the A-SRS parameters.

Level-C is fast signaling that is used by the eNodeB to communicate to the transceiver its antenna selection decisions, and to enable the antenna selection to track short-term variations due to channel fading.

In the uplink (UL), only the Level-A message is needed from the transceiver to notify the eNodeB of its capability of supporting AS. In the downlink (DL), some or all of the three levels of messages may be necessary.

Level-A Signaling

The Level-A registration signaling is used to indicate if both the transceiver and the eNodeB support uplink antenna selection. This information is exchanged between the transceiver and the eNodeB when the transceiver enters the network and before beginning data communications.

Figure 3:
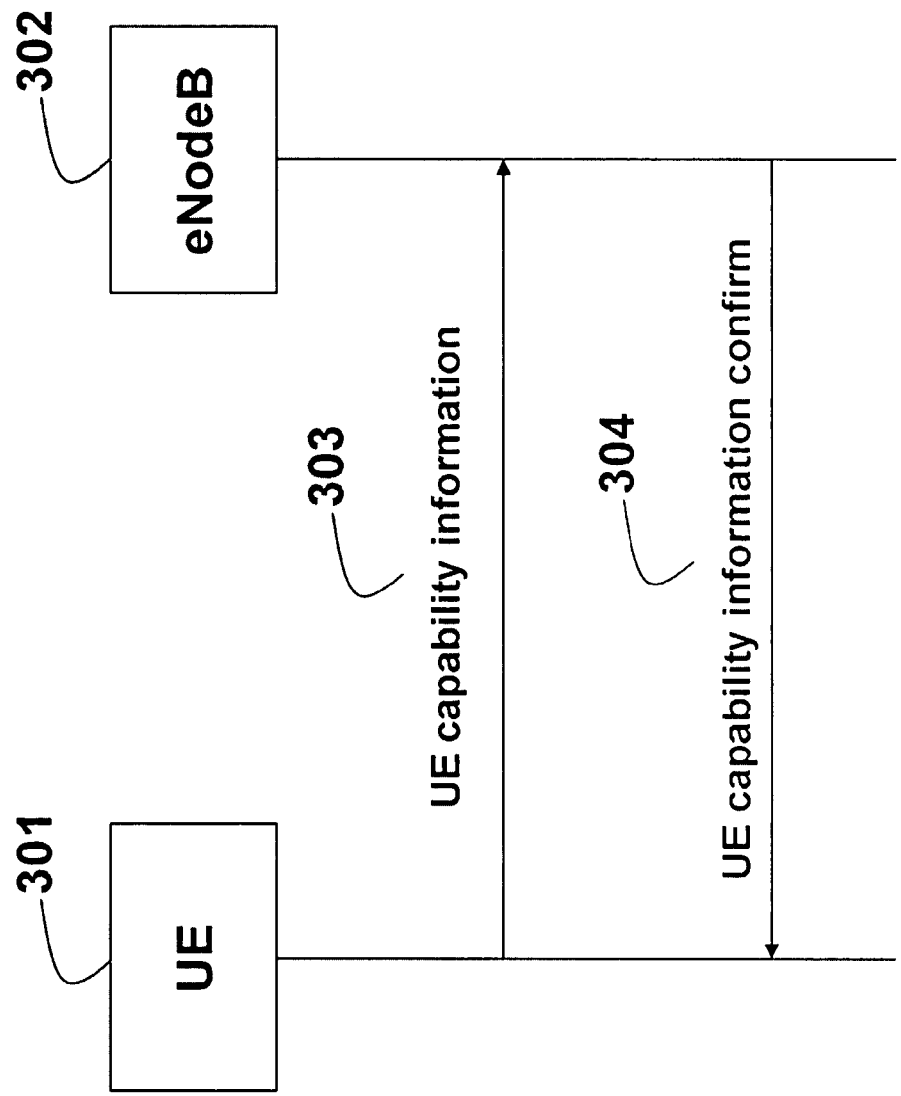
FIG. 3 is a block diagram of the Level-A registration signaling procedure according to an embodiment of the invention.

The basic procedure between transceiver and eNodeB to exchange the registration information is shown in FIG. 3. In the uplink (UL), 1-bit information is required for the UE transceiver 301 to notify the base station eNodeB 302 whether it is an antenna selection capable transceiver, or not. Similarly, in the downlink (DL), 1-bit information is needed for the eNodeB 302 to inform the transceiver about its capability to support uplink transmit AS.

In one embodiment of the invention, we include the 1-bit uplink Level-A signaling in the "UE capability information" message 303 sent by the transceiver, and include the 1-bit downlink Level-A signaling into "UE capability information confirm" message 304 sent by the eNodeB.

The "UE capability information" contains a "radio access capability" field. The "radio access capability" field further comprises a "physical channel capability" field. Similar to the "UE MIMO support" already included in the "physical channel capability", a 1-bit "UE AS support" field is added into the "physical channel capability" to indicate the UE's antenna selection capability.

It is also possible to include the above Level-A signaling information into other messages. Depending on how the radio resource control (RRC) protocol is designed in 3GPP LTE, the Level-A signaling can be adjusted accordingly.

Level-B Signaling

The frame structure for Level-B message [Option1] is shown in Table 2. The Level-B signaling is used to set up AS parameters. This information is required when the eNodeB requests the transceiver to start or stop sending the SRS, or to change A-SRS parameters. R-SRS and A-SRS share the same Level-B signaling message, except that two fields (i.e., "A-SRS Enable" and "Period2" shown in boldface in Table 2) are for A-SRS. It should be noted that all the message format descriptions provided herein are only examples and variations are possible within the scope of this invention.

TABLE 2

Frame structure for Level-B message [Option1]

| Field | Size (bits) | Comment |
|---|---|---|
| SRS Start/Stop | [1] | Request to start (when set to 1) or stop (when set to 0) sending SRS. |
| A-SRS Enable | [1] | A-SRS is enabled (when set to 1) or R-SRS is enabled (when set to 0). |
| Periodic/Adaptive | [1] | Indicates whether the SRS is performed periodically (when set to 1, until told to stop) or adaptively (when set to 0, one-shot SRS). |
| BW & Position | [FFS] | The bandwidth (in terms of number of RBs) and the starting position (in terms of RB index) for the SRS. |
| Start Sub-frame | [FFS] | The index of the sub-frame within a radio frame that the UE starts sending the SRS. |
| Symbol Position | [FFS] | The index of the LB within a sub-frame at which the SRS is located (SRS is not necessary at the $1^{st}$ LB of a sub-frame). |
| Period1 | [FFS] | The interval (in terms of number of TTIs) between two consecutive SRSs. This value does not matter for non-hopping adaptive R-SRS. |
| Period2 | [FFS] | The interval (in terms of number of SRSs) between two consecutive A-SRSs and pattern of transmission. |
| Hopping Related Fields | [FFS] | Indicates hopping related information such as number of hops, hopping pattern, etc. |

The field "SRS Start/Stop", when set to 1, indicates the request from the eNodeB to start sending SRS (for both A-SRS and R-SRS cases). Otherwise, when this bit is set to 0, then the eNodeB requests the transceiver to stop sending SRS.

The field "A-SRS Enable", when set to 1, indicates that the A-SRS is enabled. Then, all the other fields of this message are used for setting up A-SRS parameters. The meaning of each field is described in the "Comment" column of Table 2. If "A-SRS Enable" is set to 0, then R-SRS is enabled. Thus, the other fields (except "Period2") of this message are used for setting up R-SRS parameters. By sharing parameter fields with R-SRS, the overhead for enabling A-SRS is low.

The field "Period1" indicates the interval (in terms of number of TTIs) between any two consecutive SRSs, which is used for both A-SRS and R-SRS. The field "Period2", on the other hand, is only used for periodic A-SRS, which indicates the interval between two consecutive A-SRSs as well as the pattern of transmission of the A-SRS. By using "Period2", the eNodeB can dynamically adjust the portion of the SRSs that are sent from the unselected antenna, achieving a tradeoff between the performance and the antenna-switching overhead. The value "Period2" should be no less than 2. If Period2=2, then the SRS is alternatively transmitted from the selected antenna and the unselected antenna.

Upon receiving the Level-B message, the transceiver first checks the "SRS Start/Stop" field. If "SRS Start/Stop=0", then the transceiver stops sending SRS. The other fields of this message are omitted. Otherwise, if "SRS Start/Stop=1", then the transceiver is told to start sending SRS according to the format (e.g., either A-SRS or R-SRS; either periodic or adaptive, etc) defined in the parameter list.

A number of variations for the structure of the above Level-B message are possible. First, all the fields need not be sent together at the same time. Depending on the function categories, the Level-B message might be split into sub-messages and sent separately. Second, the 1-bit field "A-SRS Enable" can be inside another field of this message. Depending on how R-SRS signaling is designed in 3GPP LTE, A-SRS signaling may need to be adjusted accordingly in compliance with R-SRS.

Level-C Signaling

The frame structure for Level-C message [Options1] is shown in Table 3. The Level-C fast signaling message is used to signal the transceiver about which antenna to use for data transmission. For selecting one antenna out of two possible candidates, 1-bit information field suffices. One option is to include this 1-bit information in the "uplink scheduling grant" message. It should be noted that all the message format descriptions provided herein are only examples.

TABLE 3

Frame structure for Level-C message [Option1]

| | Field | Size (bits) | Comment |
|---|---|---|---|
| Resource assignment | ID (UE or group specific) | [8-9] | Indicates the UE (or group of UEs) for which the grant is intended |
| | Resource assignment | FFS | Indicates which uplink resources, localized or distributed, the UE is allowed to use for uplink data transmission. |
| | AS Decision | [1] | Indicates the decision on which subset of the antennas is selected for data transmission |
| | Duration of assignment | [2-3] | The duration for which the assignment is valid. The use for other purposes is FFS. |
| TF | Transmission parameters | FFS | The uplink transmission parameters (modulation scheme, payload size, MIMO-related information, etc) the UE shall use. |

The "uplink scheduling grant" is used by the eNodeB to make an uplink scheduling decision for a transceiver specified by the "ID" field. In the "resource assignment" field, the eNodeB notifies the transceiver which RBs are assigned for its data transmission. The 1-bit antenna selection decision can be created in this field. Thus, when antenna selection is enabled, the "resource assignment" field indicates a joint scheduling and antenna selection decision.

The "AS Decision" bit, when set to 1, indicates that the transceiver should switch to a different transmit antenna to transmit data. If this field is set to 0, then the transceiver uses the same antenna to transmit data. Upon receiving this message, the transceiver continues to use the same antenna, or switches to a different antenna, according to the decision made by the eNodeB. The above method corresponds to a "relative antenna index" based approach. That is, the eNodeB does not know exactly which antenna is used. Instead, the eNodeB just notifies the transceiver to either "switch" or "not switch" the subset of selected antennas. It is also possible to use an "absolute antenna index" based approach to indicate the antenna selection decision, where the eNodeB notifies the transceiver either to use the $1^{st}$ antenna, or the $2^{nd}$ antenna, or otherwise designated subsets.

It should be noted that it is also possible to include the AS decision information in other fields (e.g., "TF" field) of the uplink scheduling grant message, or even inside other message.

Signaling Description for [Option2]

As shown in Table 1B, [Option2] is similar to [Option1] except for the "SRS start/stop" message, which is a Level-B message in [Option1] and a Level-C message in [Option2]. The advantage of [Option 2] is that the SRSs (both R-SRS and A-SRS) can be configured quickly to start/stop (especially stop) for granting a priority to other transceivers. However, the disadvantage is the slightly larger payload of the Level C messages.

In [Option1], the A-SRS parameters are combined together with SRS request (either to start or stop). In [Option2], the A-SRS parameters and SRS request are sent separately. Therefore, in [Option2], the Level-B message does not include "SRS start/stop" field (i.e., the first field in Table 2). Meanwhile, 2 bits are added to the Level-C message in order to achieve the same "SRS start/stop" function. Thus, a total of 3 bits are required for Level-C message in [Option2].

The fields that constitute a Level-C message [Option2] are shown in Table 4. The Level-C message is used to indicate A-SRS request start or stop and antenna selection decision. In one embodiment of the invention, we include this 3-bit information in "uplink scheduling grant" message. It should be noted that all the message format descriptions provided herein are only examples.

TABLE 4

Frame structure for Level-C message [Option2]

| | Field | Size (bits) | Comment |
|---|---|---|---|
| Resource assignment | ID (UE or group specific) | [8-9] | Indicates the UE (or group of UEs) for which the grant is intended |
| | Resource assignment | FFS | Indicates which uplink resources, localized or distributed, the UE is allowed to use for uplink data transmission. |
| | SRS Start | [1] | Request to start (when set to 1) sending SRS. Otherwise (when set to 0), keep current status. |
| | SRS Stop | [1] | Request to stop (when set to 1) sending SRS. Otherwise (when set to 0), keep current status. |
| | AS Decision | [1] | Indicates which transmit antenna is selected for UL data transmission |
| | Duration of assignment | [2-3] | The duration for which the assignment is valid. The use for other purposes, e.g., to control persistent scheduling, 'per process' operation, or TTI length, is FFS. |
| TF | Transmission parameters | FFS | The uplink transmission parameters (modulation scheme, payload size, MIMO-related information, etc) the UE shall use. If the UE is allowed to select (part of) the transport format, this field sets determines an upper limit of the transport format the UE may select. |

Upon receiving the Level-C message, the transceiver checks "SRS start" and "SRS stop" bits. If either bit is set to 1, then this message contains the eNodeB's request to either start or stop sending SRS. When "SRS start=1", the transceiver is told to start sending SRS based oil the Level-B parameters. It is assumed that the transceiver has already obtained the Level-B parameters in advance in a separate message (or transceiver can store a set of default Level-B parameters). When "SRS stop=1", then the transceiver stops sending the SRS. However, it is possible that both bits are 0. In this case, the transceiver keeps its current SRS status, until either "SRS start" or "SRS stop" is set to 1.

The transceiver also checks the "AS Decision" bit. The responses to "AS Decision" bit are the same as [Option1] at transceiver.

It should be noted that it is also possible to include "SRS Start" and "SRS Stop" information inside another field (e.g., "TF" field) of the uplink scheduling grant message, or even inside other message. Also, the "SRS Start" and "SRS Stop" can be at a separate message from the "AS Decision". In this case, the "SRS Start" and "SRS Stop" can be combined together into 1 bit, just as that in [Option1]. However, A-SRS and R-SRS share the same SRS request. Depending on how R-SRS signaling will be designed in 3GPP LTE, A-SRS signaling may need to be adjusted accordingly in compliance with R-SRS.

Protocol for Antenna Selection

In one embodiment of the invention, our protocol utilizes the sounding reference signal (SRS) 161 for uplink transmit antenna selection, R1-073067, "Adaptive antenna switching with low sounding reference signal overhead," Mitsubishi Electric, 3GGP RAN1#49bis, R1-073068, "Impact of sounding reference signal loading on system-level performance of adaptive antenna switching," Mitsubishi Electric, 3GPP RAN1#49bis. The antenna switching is performed within a TTI, but we do not preclude between TTI switching.

In terms of functionality, the protocol is flexible and applicable to different antenna selection scenarios. First, both periodic antenna selection and adaptive antenna selection are supported. In particular, the protocol can switch between different periodic AS (with different sounding intervals), or between different adaptive AS (with different sounding intervals), or between periodic and adaptive AS, or even allow them together, as dictated by the eNodeB. Second, both non-hopping SRS based and hopping SRS based antenna selections are supported. The protocol can also switch between them as dictated by eNodeB. Third, the protocol Supports antenna selection based on different SRSs, including wide-band SRS, variable bandwidth SRS, and narrow-band SRS. Fourth, the protocol supports antenna selection for packet retransmission in both asynchronous HARQ and synchronous HARQ modes.

The current protocol focuses on 1 out of 2 antenna selection, while the extension to multiple antenna selection is possible with a cost of additional signaling overhead.

Protocol Description for [Option 1]

FIG. 4 shows the legend for protocol [Option1], which is used for the FIG. 5A to FIG. 8B, according to an embodiment of the invention. The legends are intended to simplify the details of the otherwise complex drawings. The legends are Wideband or variable bandwidth SRS 401, Narrow-band hopping SRS 402, Data block (sub-frame) if no SRS is sent at the same TTI 403, Data block (sub-frame) if SRS is sent at the same TTI 404, No data to send in a TTI 405, Level-B slower signaling: SRS parameters & SRS request 406, and Level-C faster signaling: AS & scheduling decision 407.

For clarity Level-A signaling exchange is omitted herein. It should be noted that all the protocols herein are only examples.

No Frequency Hopping—Wideband SRS and Variable BW SRS

Figure 5B:
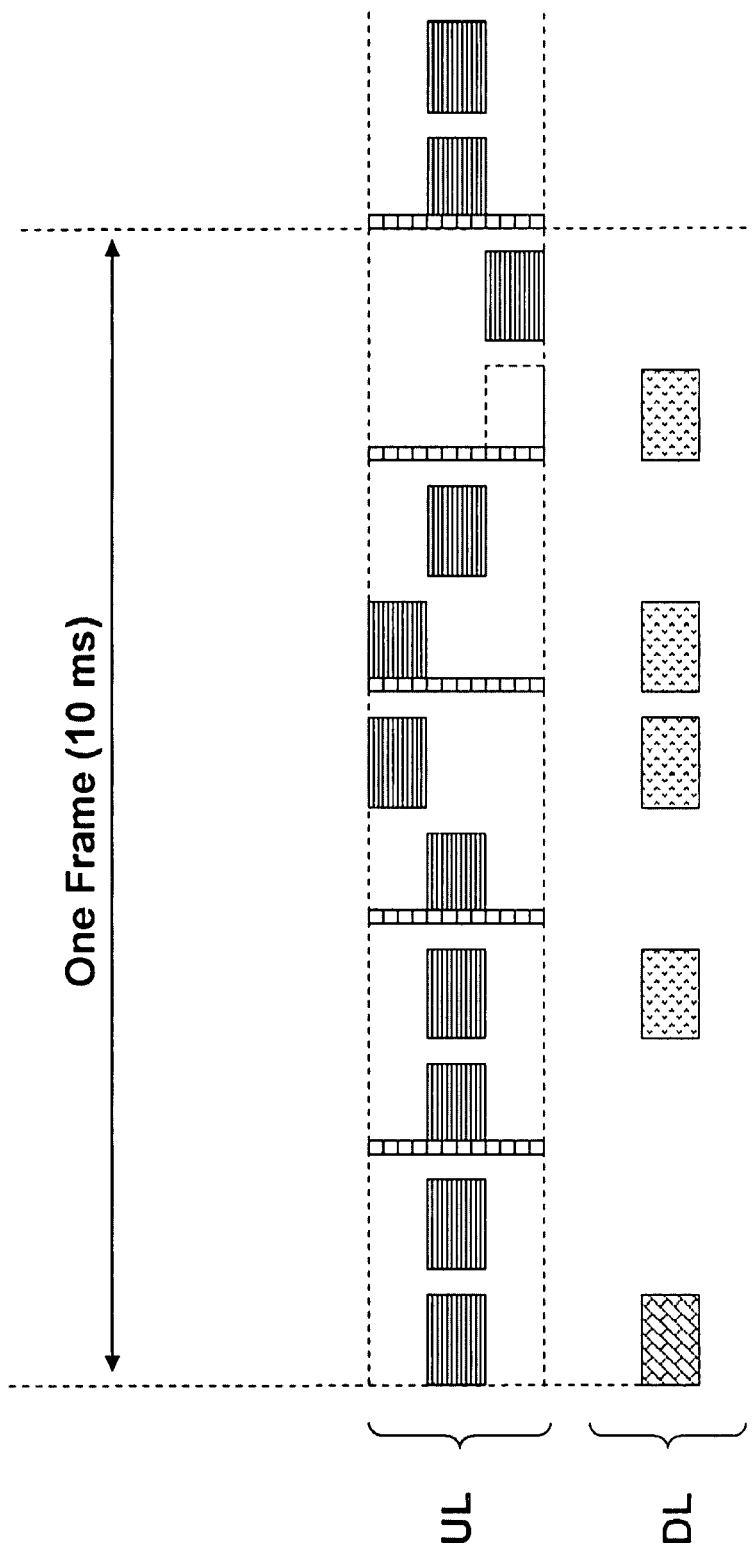

Periodic SRS: FIGS. 5A and 5B show the protocol illustration for non-hopping periodic A-SRS and R-SRS, respectively. As shown in FIG. 5A, at the $1^{st}$ TTI of a frame, the eNodeB sends a set of SRS parameters 501, which includes an "SRS Start" request. The detailed parameters are listed at the bottom-left cornier 502 in FIG. 5A. The transceiver receives this request at the $2^{nd}$ TTI 503, and gets ready to send SRS as per the parameters. Based on the parameter 502, at the $3^{rd}$ TTI (i.e., Start_Sub-frame=3), the transceiver starts sending SRS 504, and will periodically send the SRS from the two antennas at every TTI (i.e., Period1=1, until told to stop). Based on received SRS 504, the eNodeB can make a joint scheduling and AS decision 505. The transceiver receives the decision in the $5^{th}$ TTI 506, and will react with a certain TTI delay. The decision can be either a resource block assignment or an antenna selection decision or both. Note that in some TTI 507, there is no data to send, but the transceiver still needs to send SRS periodically as required. Also note that the eNodeB can make decision 508 at any time, not necessary periodically.

Because "Period2=3", one out of every 3 SRSs is sent from the unselected antenna. As shown in FIG. 5A, the SRS 509 at the $5^{th}$ TTI, the SRS 510 at the $8^{th}$ TTI, and the SRS 511 at the $1^{st}$ TTI of the next frame, are sent from the unselected antenna, while the rest SRSs are sent from the selected antenna.

For comparison purpose, FIG. 5B shows the protocol for non-hopping periodic R-SRS, which can be seen from the parameter 512 with "AS Enable=0". The difference is that the decision from eNodeB is only a scheduling decision, not an antenna switching decision. The SRSs are sent periodically every 2 TTIs ("Period1=2"). The "Period2" field is no use for R-SRS case.

In FIGS. 5A and 5B, the parameter "Num_Hops=1" means that the entire bandwidth is covered by 1 hop. That is, no frequency hopping is involved. If "Num_Hops>1", then frequency hopping is applied for SRS.

It should be noted that in the example protocols, we assume a certain delay for the eNodeB to make AS and scheduling decision, and a certain delay for the transceiver to react to the eNodeB's instruction. The delay depends on the standard specification, and the values provided herein are only examples.

Figure 6B:
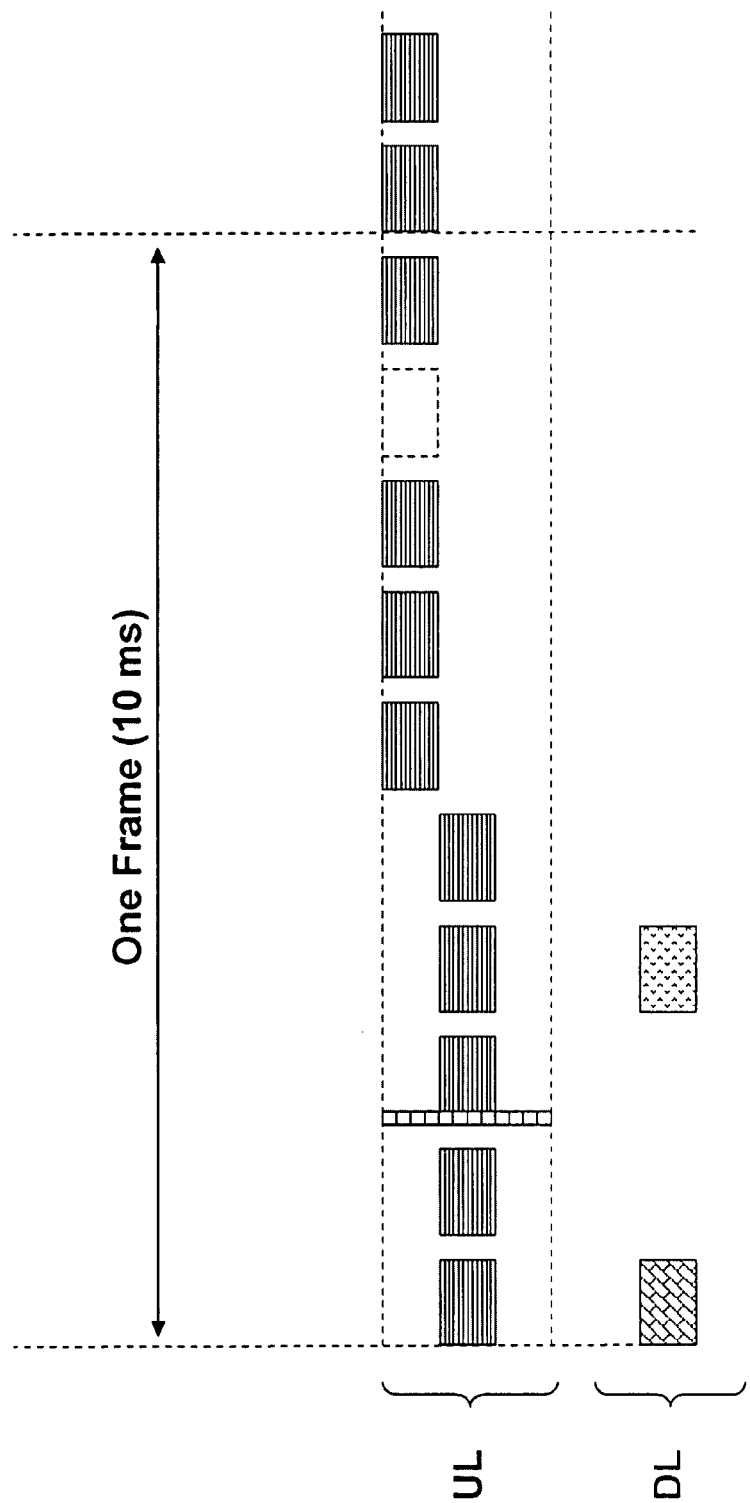

Adaptive SRS: FIGS. 6A and 6B show the protocol for non-hopping adaptive A-SRS and R-SRS, respectively. Compared to the case with periodic antenna selection where the SRSs are sent periodically (until told to stop), adaptive SRS is a "one-shot" SRS transmission as per the eNodeB's request. For the A-SRS shown in FIG. 6A, two SRSs are sent by the two antennas successively, with the interval determined by the "Period1" field in the parameter list. Similar to the periodic case, the eNodeB makes scheduling and/or AS decision based on the received A-SRSs. For the R-SRS shown in FIG. 6B, only one SRS is sent by the transmit antenna. Therefore, the "Period1" field is of no use in this case.

Frequency Hopping-Narrow-band SRS

Figure 7B:
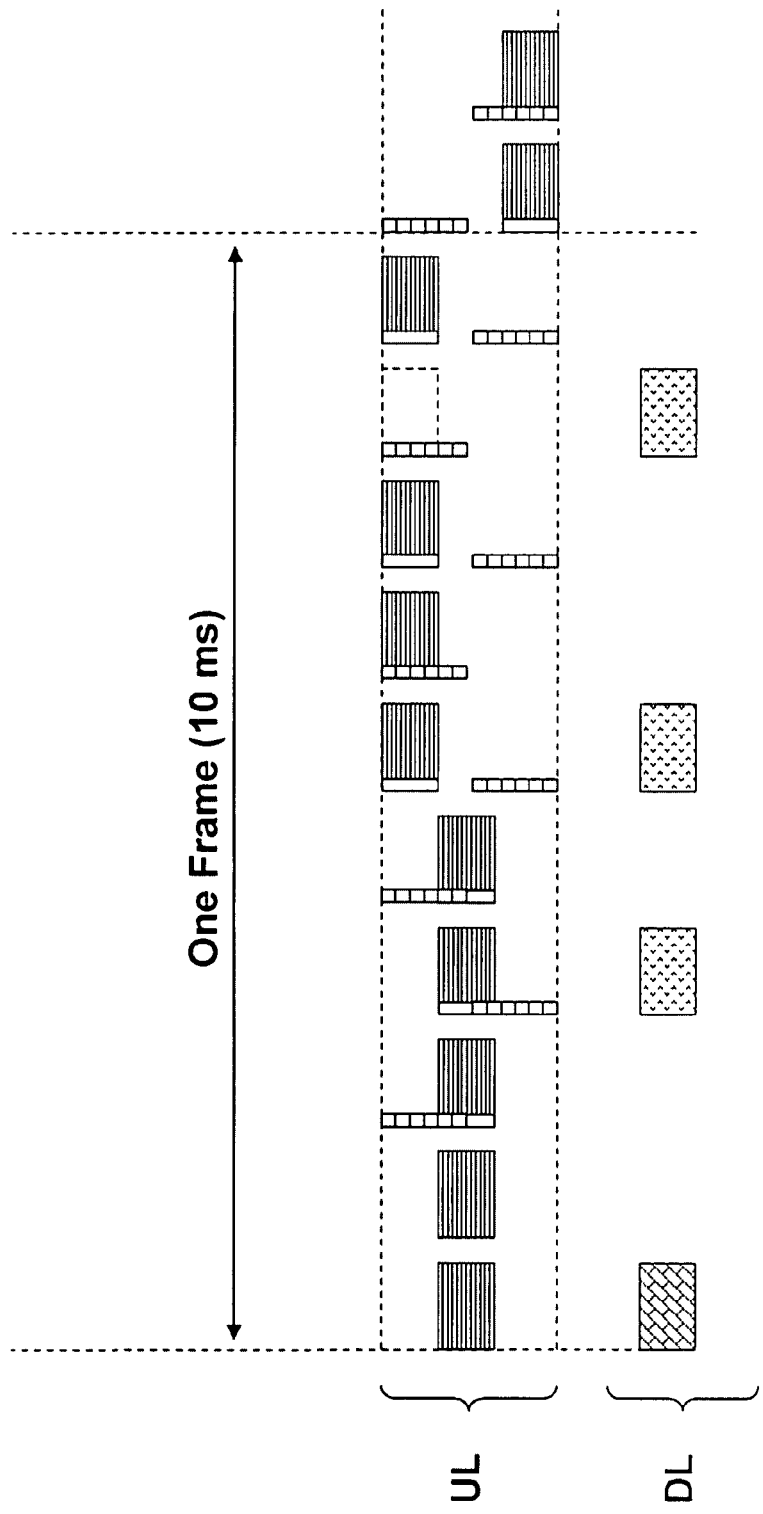
Figure 11B:
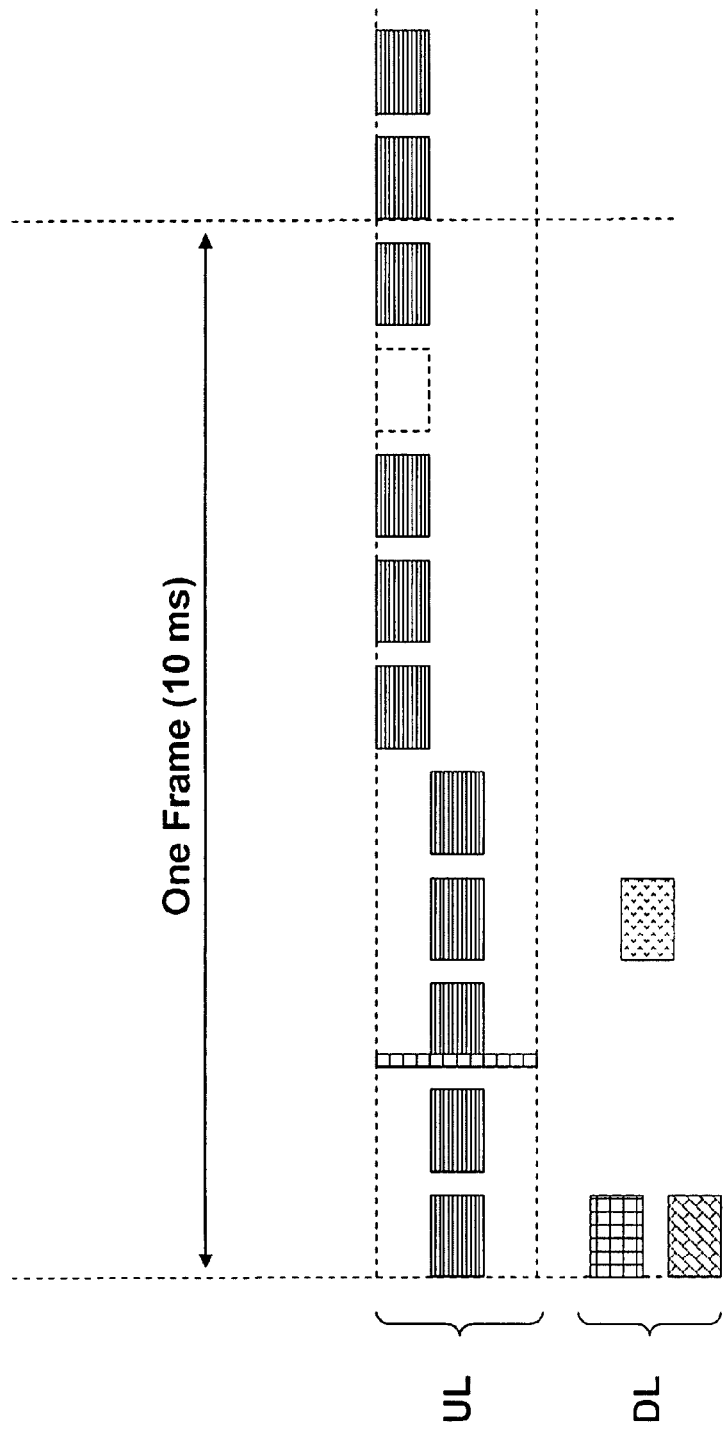
Figure 12A:
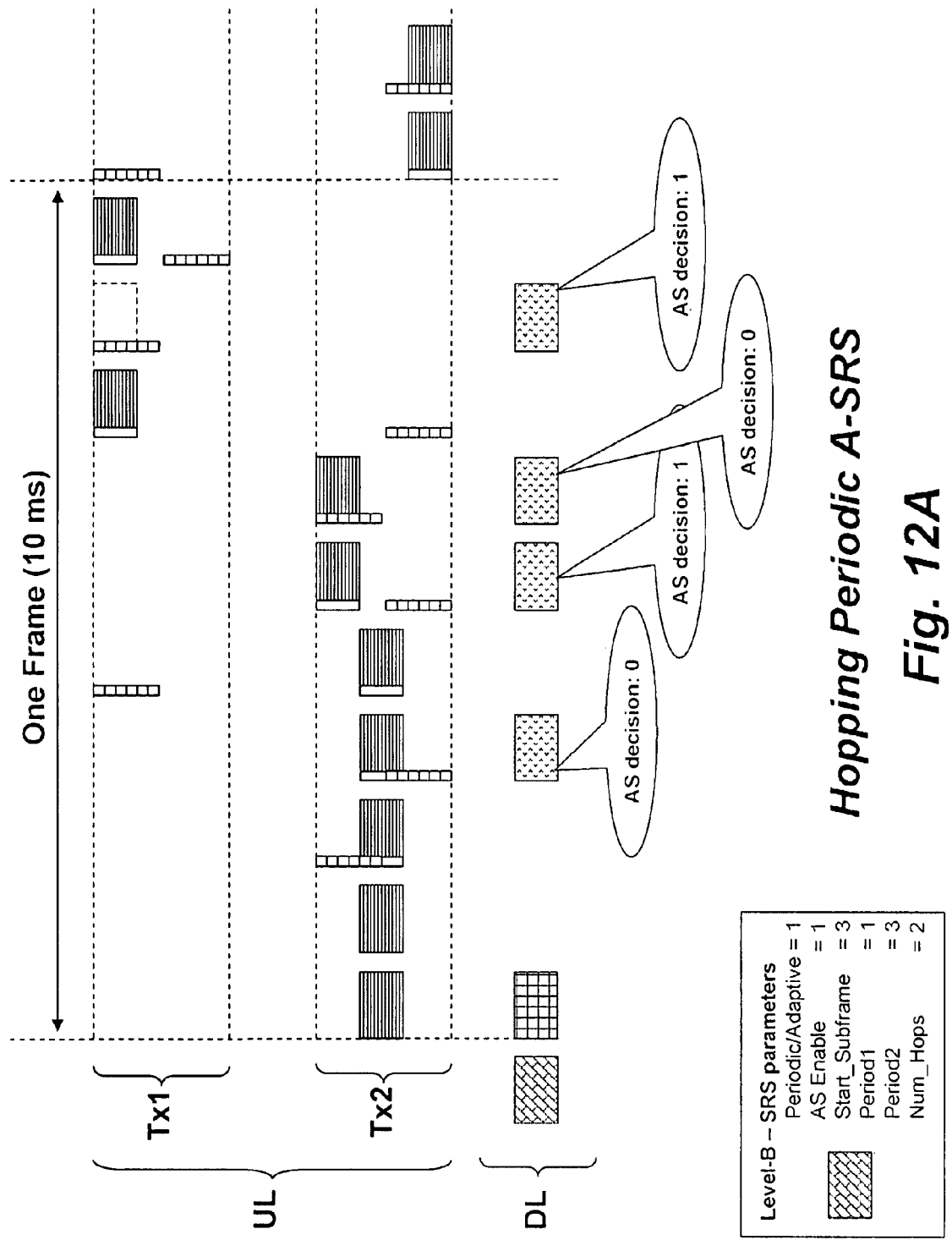
Figure 12B:
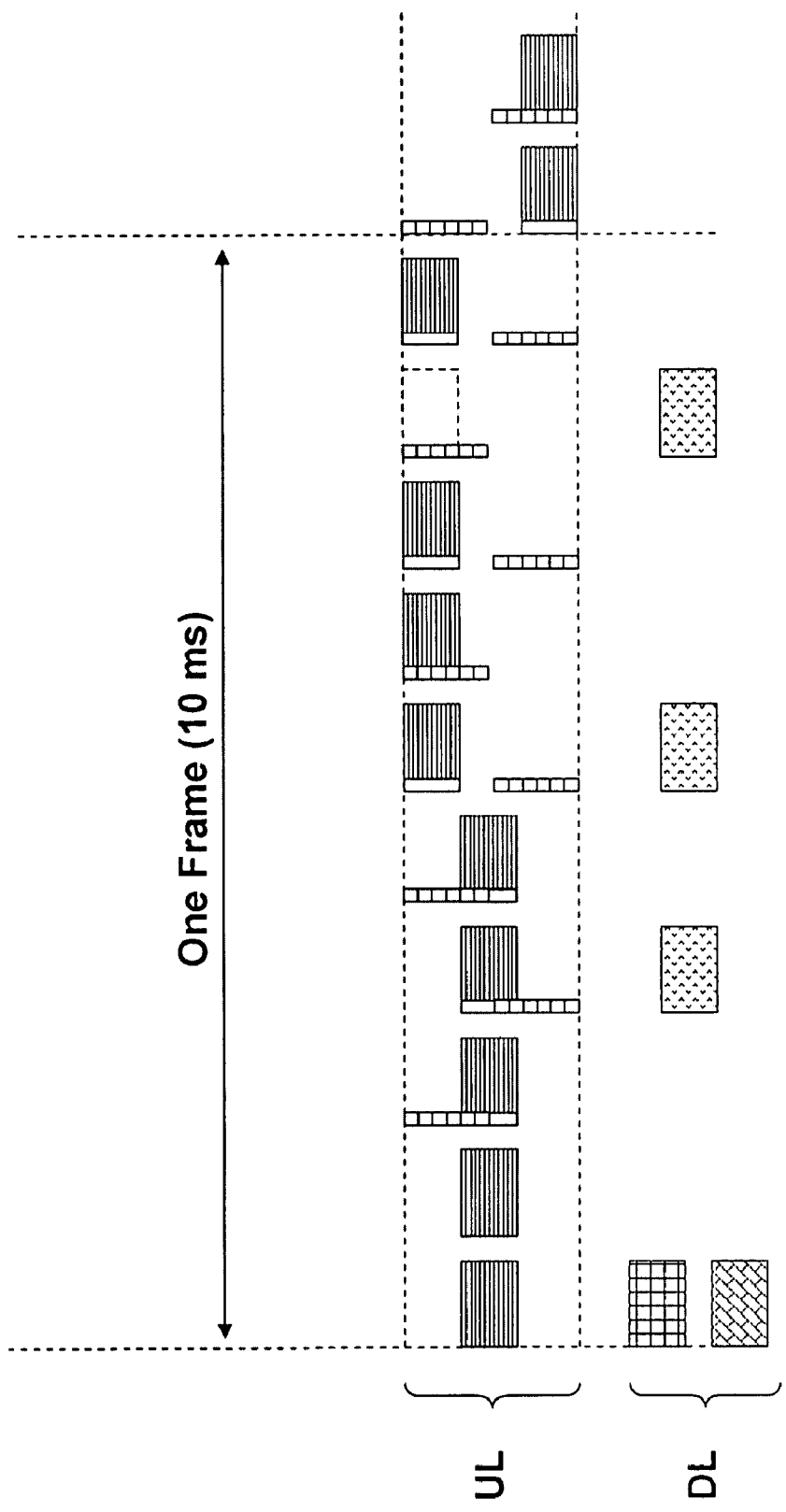
Figure 13B:
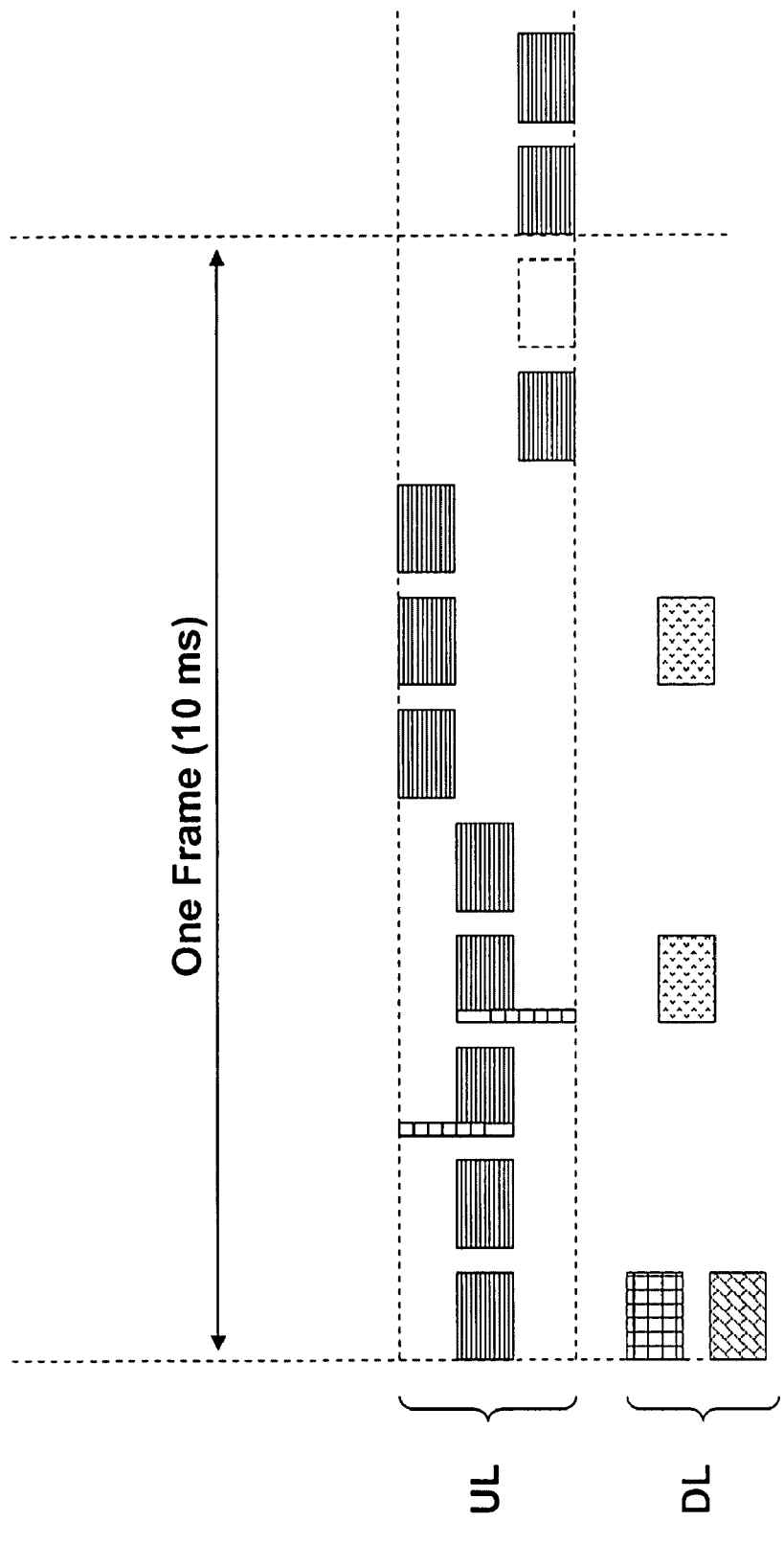

Periodic SRS: FIGS. 7A and 7B show the protocol for hopping periodic A-SRS and R-SRS, respectively. For example purposes, we assume that the entire bandwidth is covered by 2 hops (Num_Hops=2), and each narrow-band SRS spans half of the available bandwidth. As shown in FIG. 7A, in order to make each of the two antennas sound the entire bandwidth, a total of 4 SRSs are required in each sounding cycle. The interval between two consecutive SRSs is determined by "Period1" field of the parameter list 701 (it is set to 1 in the Figure as an example). Similar to the non-hopping case, because "Period2=3" in the parameter list 701, one out of every 3 SRSs is sent from the unselected antenna. Specifically, the SRS 702 at the $5^{th}$ TTI, the SRS 703 at the $8^{th}$ TTI, and the SRS 704 at the $1^{st}$ TTI of the next fame, are sent from the unselected antenna, while the rest SRSs are sent from the selected antenna. The eNodeB can make a scheduling and AS decision each time when it receives an A-SRS.

As shown in FIG. 7B, when "AS Enable=0" the transceiver transmits R-SRS from only one antenna. A total of 2 SRSs are required in each cycle to sound the entire bandwidth. Based on the received SRSs, the eNodeB makes scheduling decisions without any antenna selection.

Adaptive SRS: FIGS. 8A and 8B show the protocol for hopping adaptive A-SRS and R-SRS, respectively. As shown in FIG. 8A, upon receiving the request 801 from the eNodeB, the transceiver sends a total of 4 SRSs. Based on one or more SRSs, the eNodeB can make AS and scheduling decisions at any time. In FIG. 8B, because R-SRS is employed (AS Enable=0), a total of 2 SRSs is sent by the transceiver for the eNodeB to make scheduling decisions. The interval between the 2 SRSs is determined by the "Period1" field.

Protocol Description for [Option2]

FIG. 9 shows the legend for protocol [Option2], which is used for the illustrations from FIG. 10A to FIG. 13B. The legends are Wideband or variable bandwidth SRS 901, Narrow-band hopping SRS 902, Data block (sub-frame) if no SRS is sent at the same 903, Data block (sub-frame) if SRS is sent at the same TTI 904, No data to send in a TTI 905, Level-B slower signaling: SRS parameters, 906, Level-C faster signaling: SRS request (to start) 907, and Level-C faster signaling: AS & scheduling decision 908. For clarity Level-A signaling exchange is omitted herein. It should be noted that all the protocol illustrations provided herein are only examples.

Similar to FIGS. 5A to 8B, FIGS. 10A to 13B show the same SRS scenarios when the signaling is set to [Option2], respectively. Recall that in [Option2], the Level-B SRS parameters are sent separately from the Level-C SRS start/stop request. Also, it is assumed that when the transceiver receives an SRS request, the transceiver has obtained of the required SRS parameters in a separate Level-B message (or uses default values for the parameter values it has not received yet). For instance, as shown in FIG. 10A, the eNodeB can send the SRS parameters 1001 and the SRS request 1002 at the same TTI. As shown in FIG. 11A, the SRS parameter 1101 can also be sent before the SRS request 1102. The other procedures are the same as [Option 1].

Switching between Different SRS Patterns

In order to switch between different SRS patterns (e.g., periodic vs. adaptive, hopping vs. non-hopping, etc), a Level-B slower signaling from the eNodeB to the transceiver is required for both [Option1] and [Option2] to set up different SRS parameters. In addition, for [Option2], an "SRS Start" from the eNodeB to the transceiver is also needed.

It should be noted that under the Current protocol, the eNodeB can possibly send SRS request and the AS decision in the same TTI. It should also be noted that when the number of hops (i.e., the "Num_Hops" field in parameter list) is larger than 2, different lopping patterns that jointly span the frequency-space domain can be designed. The pattern can be either signaled by the eNodeB or is chosen from a pre-determined set. In FIGS. 5A to 8B and FIGS. 10A to 13B, only the procedure of "SRS Start" is shown. The procedure of "SRS Stop" is not shown in these figures, and is sent in a similar manner.

Antenna Selection Protocol for HARQ

Asynchronous HARQ

If the system operates in an asynchronous HARQ mode, then the eNodeB indicates to the transceiver when, which RBs, and with what MCS (modulation and coding scheme) to retransmit the packet. Because the eNodeB has complete control over the packet retransmission in asynchronous HARQ, the eNodeB can also signal the transceiver whether or not to switch the antenna for retransmission. It can also indicate to the transceiver to send an aperiodic or a periodic A-SRS. In this case, the eNodeB makes a joint AS and scheduling decision for the retransmitted packet, similar to that for a normal packet.

Synchronous HARQ

If the system operates in synchronous HARQ mode, then the transceiver knows a priori exactly when to retransmit the packet when it does not receive an ACK from the eNodeB after a pre-specified number of TTIs. In this case, the transceiver uses the same resource block (RB) and same MCS for the retransmission. Because the transceiver has complete control over the packet retransmission in synchronous HARQ, whenever retransmission occurs, the transceiver can automatically switch to another subset of antennas to retransmit (using the same RB and MCS). This is to avoid the scenario that the channel quality of the previously selected subset of antennas is poor.

Implicit SRS Signaling

So far we have described methods of signaling where requests for starting and stopping sounding reference signals (SRS) are indicated explicitly, with the SRS Start/Stop bit in the first field of the Level-B message, see Table 2.

Implicit SRS

In another embodiment, we do not use the explicit SRS Start/Stop" bit in Table 2. Instead, we use the seventh "Period1" field to implicitly achieve the same functionality. Specifically, we set the "Period1" field to zero in the Level-B signaling message to disable SRS, and thus to disable the antenna selection. If the "Period1" field is non-zero, then the Level-B message implicitly indicates "SRS enable."

Upon receiving the Level-B message, the transceiver first checks the "Period1" field. If "Period1" is non-zero, then the transceiver starts sending SRS according to the indicated format, e.g., either A-SRS or R-SRS, either periodic or adaptive, etc. as defined in the parameter list of the Level-B message. Otherwise, when the Period1 field is zero, the transceiver stops sending SRS, and the other fields of this message are omitted.

Other alternatives embodiments for the structure of the above Level-B signaling message are possible. In one embodiment, the fields are partitioned into sub-messages and transmitted separately.

Some parameters such as "Symbol Position" and "BW & Position" can be specific for a particular cell or base station. Therefore, it is also possible to broadcast the parameters via the dynamic broadcast channel (D-BCH) by the eNodeB (base station).

The AS dependent parameters "A-SRS Enable" and "Period2" can be an "OP" field in L3 signaling, meaning an optional extension. If the "Period2" parameter is ignored, then the SRSs are alternatively transmitted from the two transmit antennas in the A-SRS case.

Implicit Grant Signaling

In one embodiment of the Level-C message of Table 3, we do not use a bit in UL grant message to indicate which antenna to use. Instead, the sub-frame position of UL grant is used to implicitly indicate antenna selection decisions. Specifically, even sub-frames of the UL giants indicate using the first antenna or subset of antennas, and odd sub-frames indicate the second antenna or subset of antennas.

The UL grant, when transmitted during the even sub-frame, indicates that the transceiver will use the first antenna to send data. On the other hand, if the UL grant is transmitted during the odd sub-frame, then the UE will use the second antenna to send data. The above method corresponds to an "absolute antenna index" based approach. It is also possible to use a "relative antenna index" based approach, where the even and odd sub-frames of the UL grant indicate "switch to a different antenna" and "keep using the same antenna", respectively.

Protocols

FIG. 14A shows the protocol for non-hopping periodic A-SRS in the presence of parameter "Period2". As shown in FIG. 14A, at the $1^{st}$ TTI of a frame, the eNodeB sends Level-B signaling including a set of SRS parameters 1401, which is treated as all implicit "SRS Start" request. Only relevant parameters are shown in the list 1401, and the other parameters are omitted for simplicity.

The mobile transceiver receives this request at the $2^{nd}$ TTI 1402, and prepares to transmit the SRS according to the indicted parameters. Based on the parameters 1401, at the $3^{rd}$ TTI, i.e., Sub-frame Offset=3, the transceiver starts sending SRS 1403, and will periodically send the SRS from the two antennas alternately at every TTI, i.e., Period1=1, until requested to stop).

Based on the received SRS 1403, the eNodeB makes a joint scheduling and AS decision 1404 in the $3^{rd}$ sub-frame. Because the UL grant 1404 is transmitted at the odd sub-frame 1421, this control signaling indicates that the UE should use T×2 for data transmission.

The transceiver receives the decision in the $4^{th}$ TTI 1405, and responds accordingly. Similarly, the UL grants transmitted at the $5^{th}$ TTI of the same frame and the $1^{st}$ TTI of the next frame also indicates that the UE should use T×2 for data transmission. On the other hand, the UL grants transmitted at the even ($6^{th}$, $8^{th}$, and $10^{th}$) TTI's indicates 1422 that the UE should switch to T×1 for data transmission.

Because "Period2=3", one Out of every 3 SRSs is sent from the unselected antenna. As shown in FIG. 14A, the SRS 1406 at the $5^{th}$ TTI, the SRS 1407 at the $8^{th}$ TTI, and the SRS 1408 at the $1^{st}$ TTI of the next fame, are sent from the unselected antenna, while the rest SRSs are sent from the selected antenna.

Finally, in the $3^{rd}$ TTI of the next frame, the eNodeB sends another Level-B signaling message 1409 with "Period1=0". Thus, this message requests the UE to stop sending SRS. Upon receiving this message, the UE disables SRS 1410 at the $4^{th}$ TTI of the next frame.

Figure 14B:
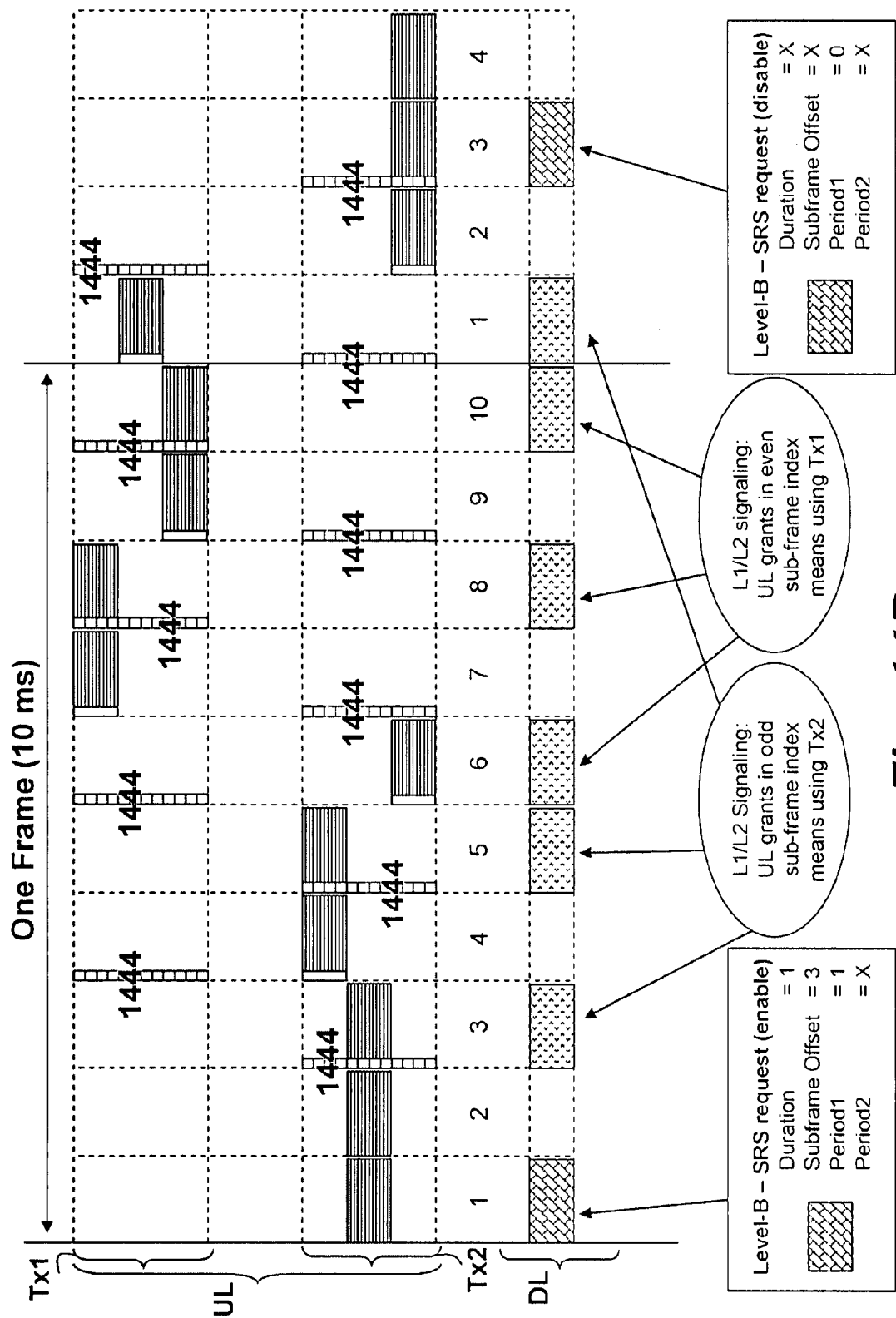
FIG. 14B is a block diagram of non-hopping A-SRS protocols in the absence of parameter "Period2" according to embodiments of the invention.

For comparison purpose, FIG. 14B shows the protocol for non-hopping periodic A-SRS, when ignoring the parameter "Period2". The only difference between FIG. 14A and FIG. 14B is that, in the absence of "Period2", the SRSs 1444 are alternatively transmitted by the two antennas. The transmission pattern of SRS is independent of data transmission.

In the protocol illustration FIGS. 14A and 14B, we only show the examples of non-hopping A-SRS. The protocol also supports other SRS patterns such as narrow-band hopping SRS, adaptive SRS, R-SRS, and the combination of the above as described herein.

EFFECT OF THE INVENTION

The embodiments of the invention provide signaling and protocol for antenna selection in the uplink of OFDM 3GPP wireless between the transceiver and the eNodeB.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting antennas in a wireless network including a base station and a plurality of user equipment (UE) transceivers, comprising:
   specifying, in a base station of a frequency division multiplexing wireless network, times and frequencies when to transmit sounding reference signals (SRSs) by a transceiver of the network, in which the transceiver includes a set of available antennas;
   enabling and disabling a transmission of the SRSs implicitly;
   transmitting the SRS by the transceiver according to the specified times, frequencies, and antennas only when the transmission is enabled;
   selecting a subset of antennas of the set of available antennas in the base station based on the received SRSs;
   indicating the selected subset of antennas to the transceiver, and wherein a first subset of antennas is selected for even sub-frames, and a second subset of antennas is selected for odd sub-frames, and
   transmitting data from the transceiver to the base station using the selected subset of antennas.

2. The method of claim 1, further comprising:
   indicating the implicit enabling and disabling in a Period1 field of a Level-B message, in which the Period1 field is zero to disable and non-zero to enable.

3. The method of claim 2, further comprising:
   partitioning fields of the Level-B message into sub-messages; and
   transmitting the sub-messages separately.

4. The method of claim 2, in which the fields include Symbol Position and BW & Position, and further comprising:
   specifying the Symbol Position and BW & Position field only for the base station; and
   broadcasting fields via a dynamic broadcast channel of the base station.

5. The method of claim 1, in which the selecting of the subset of antennas implicitly.

6. The method of claim 1, further comprising:
   broadcasting antenna selection capability information from the base station to the transceiver.

7. The method of claim 1, in which the antenna selection is performed periodically.

* * * * *